United States Patent [19]

Stewart

[11] Patent Number: 5,545,935

[45] Date of Patent: Aug. 13, 1996

[54] RECHARGEABLE SYSTEM WITH SEPARATE BATTERY CIRCUITS IN A COMMON MODULE

[75] Inventor: Gregory N. Stewart, Austin, Tex.

[73] Assignee: Dell USA, L.P., Austin, Tex.

[21] Appl. No.: 443,610

[22] Filed: May 18, 1995

Related U.S. Application Data

[63] Continuation of Ser. No. 119,904, Sep. 10, 1993, abandoned, which is a continuation of Ser. No. 656,265, Feb. 14, 1991, abandoned.

[51] Int. Cl.$^6$ ........................................... H02J 7/00
[52] U.S. Cl. ........................... 307/150; 307/86; 320/37
[58] Field of Search ..................... 364/948.9, 948.5, 364/273, 273.4; 395/750; 429/7.61, 99, 179; 320/14, 15, 37, 38; 307/64, 66, 85–87, 150

[56] References Cited

U.S. PATENT DOCUMENTS

| | | | |
|---|---|---|---|
| 2,506,524 | 5/1950 | Stuck | 307/150 |
| 3,577,003 | 5/1971 | Behr et al. | 307/66 |
| 4,214,172 | 7/1980 | See | 307/150 |
| 4,217,400 | 8/1980 | Leffingwell | 429/61 X |
| 4,255,697 | 3/1981 | Buhler | 320/6 |
| 4,323,788 | 4/1982 | Smith | 307/66 |
| 4,451,742 | 5/1984 | Aswell | 307/66 |
| 4,492,876 | 1/1985 | Colbert et al. | 307/66 |
| 4,694,237 | 9/1987 | Hanson | 320/6 |
| 4,961,151 | 10/1990 | Early et al. | 320/15 |
| 4,998,055 | 3/1991 | Nash et al. | 320/2 |
| 5,015,546 | 5/1991 | Dulaney et al. | 429/99 |
| 5,148,042 | 9/1992 | Nakazoe | 307/66 X |

*Primary Examiner*—Fritz M. Fleming
*Attorney, Agent, or Firm*—Haynes and Boone L.L.P.

[57] ABSTRACT

A portable electronic system which has two electrically separate battery banks in a single removable battery pack. A power-management controller switches between the two banks in service—even when neither of the banks is exhausted—to provide optimal active and resting times for the batteries.

3 Claims, 3 Drawing Sheets

RECHARGEABLE SYSTEM WITH SEPARATE BATTERY CIRCUITS IN A COMMON MODULE

RELATED APPLICATION DATA

Ser. No. 07/656,265, filed Feb. 14, 1991 is the parent application which is now abandoned; Ser. No. 08/119,904, filed Sep. 10, 1993 is a continuation of Ser. No. 07/656,265 which is now abandoned; Ser. No. 08/443,610 is the present application which is a continuation application of Ser. No. 08/119,904.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO OTHER APPLICATIONS

The following applications of common assignee contain at least some drawings in common with the present application, and are believed to have effective filing dates identical with that of the present application, and are all hereby incorporated by reference:

Ser. No. 655,889, filed Feb. 14, 1991, entitled "Portable Computer with BIOS-Independent Power Management";

Ser. No. 656,647, filed Feb. 14, 1991, entitled "Portable Computer System with Adaptive Power-Control Parameters";

Ser. No. 655,619, filed Feb. 14, 1991, entitled "Portable Computer with Dual-Purpose Standby Switch";

Ser. No. 656,262, filed Feb. 14, 1991, entitled "Method for Detecting Low Battery State Without Precise Calibration".

BACKGROUND AND SUMMARY OF THE INVENTION

The present invention relates to portable battery-powered electronic systems.

Constraints of Available Rechargeable Battery Technology

Portable computers, like many other portable electronic or electrical systems, often use rechargeable batteries for their power source. Users often prefer rechargeable batteries for convenience and for long system life.

The specific rechargeable battery type most often used is the Ni—Cd battery. As of 1990, no other rechargeable battery technology can match the power-to-weight ratio and cost-per-joule of Ni—Cd batteries. Even if affordable new battery technologies are introduced (as may be expected), such improvements will be driven by battery manufacturers, not by computer system designers. Moreover, many of the same battery-management requirements will apply to other battery technologies as well as to Ni—Cd batteries.

Ni—Cd batteries have some significant nonlinearities which make optimal control difficult. Other battery types may share some or all of the following characteristics; but the following discussion will be primarily directed toward Ni—Cd batteries, because of their dominance of the rechargeable battery market.

One non-linear effect is the well-known "memory" effect. If a Ni—Cd battery is repeatedly only partially discharged before recharging, the microstructure of the battery will gradually adapt, so that the battery's full capacity is no longer available.

Another non-linear effect is that total amount of energy which can be withdrawn in a discharge cycle is somewhat dependent on the rate of discharge.

A further non-linear effect is the use of "trickle charge" currents. A battery which is already fully charged can be maintained at maximum readiness by applying a very small current to the battery. This phenomenon is very well known in lead acid batteries and also applies to Ni—Cd batteries.

Bank-Switching in a System with Two Battery Banks

The chemistry of a Ni—Cd battery can become imbalanced at the battery's peak rate of discharge, with resulting net loss of stored charge. The present invention permits this problem to be avoided.

The present invention provides improved management of the discharge cycle of Ni—Cd batteries, by drawing current alternately from two banks of batteries, while monitoring the voltage across and current through each.

The innovative teachings disclosed herein provide a portable electronic system which has two electrically separate battery banks in a single removable battery pack. A power-management controller switches between the two banks to provide optimal active and resting times for the batteries.

Bank-switching is preferably performed by a relay. This has been found to give low power loss during switching, and adequate robustness against transients.

In a contemplated alternative (but advantageous) embodiment, current monitoring is used to permit the changing characteristics of the batteries during discharge to be precisely monitored. However, in the invention as presently practiced, a simple timing function is used to govern the bank-switching.

In the presently preferred embodiment, the microcontroller can read the voltage of both battery banks at all times. Therefore, by observing the voltage differential as the load is switched, the banks are load-tested. This can be performed as part of the POST (power-on self-test) routine.

A difficulty with current battery systems is detecting when the battery is nearing the end of its life. A further advantage of the disclosed innovations is that they permit the full history of each battery pack to be monitored accurately.

Some prior systems have had the capability to switch between two banks of batteries. See, for example, U.S. Pat. No. 4,451,742 to Aswell, which is hereby incorporated by reference. However, such prior teachings are believed to have concentrated on issues of reliability and additional redundancy. By contrast, the present invention provides an arrangement wherein two banks of batteries are used, not primarily for reasons of improved reliability, but rather to provide improved battery management (and maximization of battery life).

In particular, portable computers have been proposed with two separate removable banks of rechargeable batteries. In such systems, the user could remove and replace the battery packs without ceasing operation (as long as a usable battery pack remained available in either one of the battery slots).

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Overall Organization

The presently preferred embodiment provides a 80C286 or 386SX laptop computer, with hard disk and LCD display, powered by rechargeable Ni—Cd batteries and a nonrechargeable lithium battery.

Electrical Organization

Figure 1:
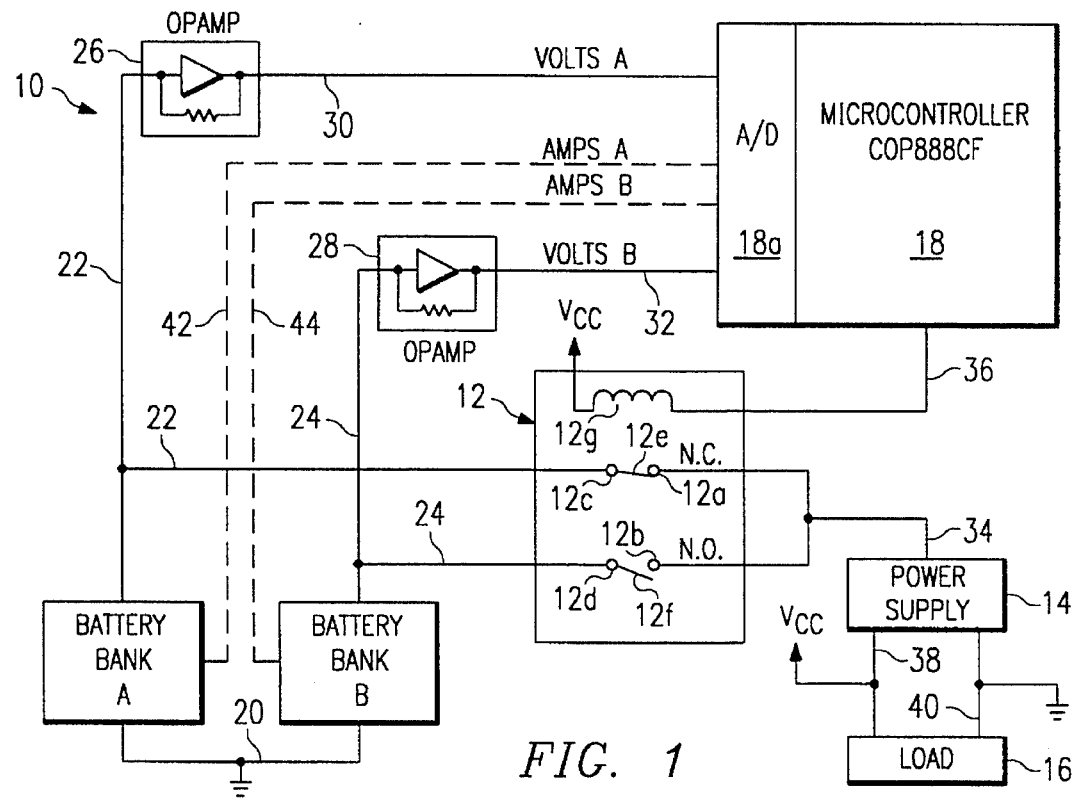
FIG. 1 shows the overall electrical organization of the portable laptop computer of the presently preferred embodiment.

FIG. 1 shows the overall electrical organization of the portable laptop computer of the presently preferred embodiment.

The presently preferred embodiment is actually planned for production in two versions, one using a CMOS version of the 80286 processor and one using a CMOS version of a 386SX processor. Of course, these two processors are extremely similar to each other, and the differences between them have little relevance to the power of management architecture features described. Disclosed innovations can be applied not only to other Intel 8086-derived processors, such as the 80386 and 80486, but can also be applied to other processor families which may, in the future, find use in low-power portable computer systems.

The presently preferred embodiment relates to systems used in the ISA architecture. (Such systems are also referred to as systems which use the "AT bus.") However, it is alternatively possible to adapt at least some of the disclosed teachings to other architectures, such as EISA bus systems or to other buses which may find use in the future.

In the presently preferred embodiment, an HT21 chip, from Headland Technologies, is used to provide a variety of peripheral support functions to the main microprocessor. These include bus management, memory management, interrupt control, and DMA control. Serial port management and keyboard interface are provided by an 82C186 combination chip from VTI. Of course, other implementations of support logic and glue logic can be used if desired, within this well-known architecture.

The presently preferred system embodiment is a family of two highly similar notebook computers, varying primarily in the processors used. Both have an external closed size of about 8.5×11×2 inches. One version is based on an Intel 80C286 microprocessor running at 12.5 MHz, and the other version is based on an Intel 386SX processor running at 20 MHz. Both notebooks contain similar I/O devices, including, in the presently preferred embodiment:

a Sharp VGA flat panel display;

Conners Peripherals 222 or 242 20 or 40 MB 2.5" hard disk;

Epson 3.5" floppy disk drive;

WD 90C20 VGA controller chip;

VTI 82C106 I/O combo chip;

1 MB on board VSOP memory;

2 expansion memory slots; and

Power management microcontroller, with the Microcontroller Interface chip ("MILES") gate array assembly.

In addition, the following I/O connectors are available on the back panel for external devices:

25 pin D connector for parallel/floppy disk;

9 pin D connector for serial;

15 pin D connector for external CRT;

6 pin DIN connector for mouse; and 6 pin DIN connector for external keyboard.

Also available, through slide off panels, are an expansion connector for an optional modem, an 80387SX numeric coprocessor socket, and the 2 expansion memory connectors.

Rechargeable Battery Module

Figure 4A:
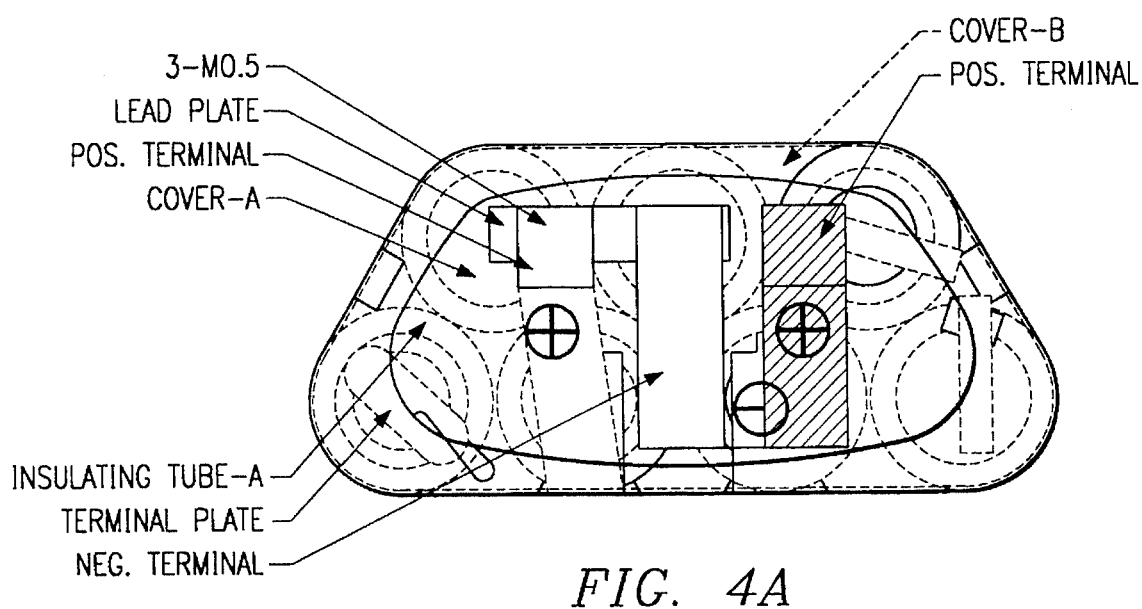
FIG. 4A shows the physical structure.
Figure 4B:
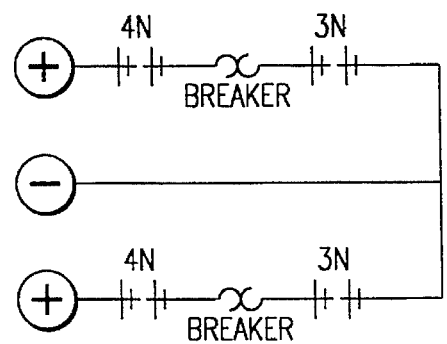
FIG. 4B shows the electrical connections, of the rechargeable battery module of the presently preferred embodiment, containing two electrically separate banks of 7 batteries each.

FIG. 4A shows the physical structure, and FIG. 4B shows the electrical connections, of the rechargeable battery module of the presently preferred embodiment, containing two electrically separate banks of 7 batteries each. Note that a fuse is included in the middle of each bank of batteries.

In the presently preferred embodiment, the battery module is configured as two banks of 7 Ni—Cd batteries in series. Thus, each bank provides a rated voltage of 8.4 Volts.

The battery sizes are selected, in the presently preferred embodiment, to provide a charge capacity of 1700 mA-hr for each bank; but of course the battery sizings could be changed if needed.

Connections for Power Supply and Management

Figure 2:
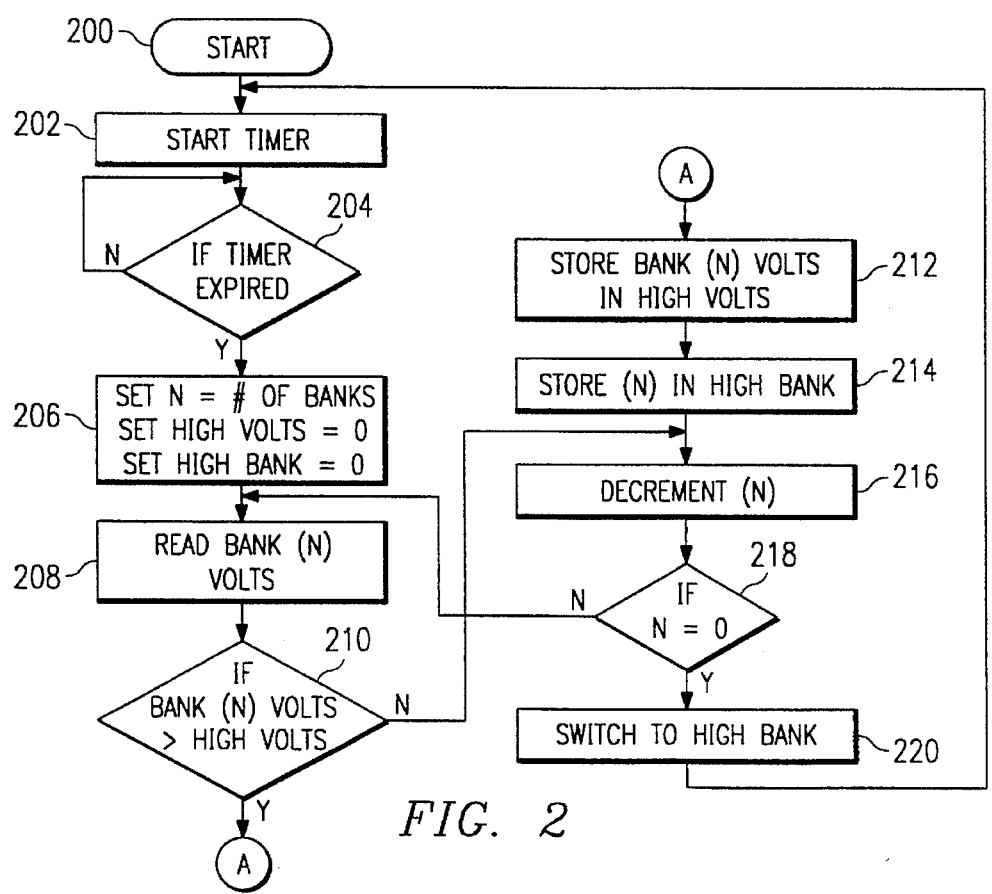
FIG. 2 shows the analog connections used, in the presently preferred embodiment, for monitoring the state of the two battery banks.
Figure 3:
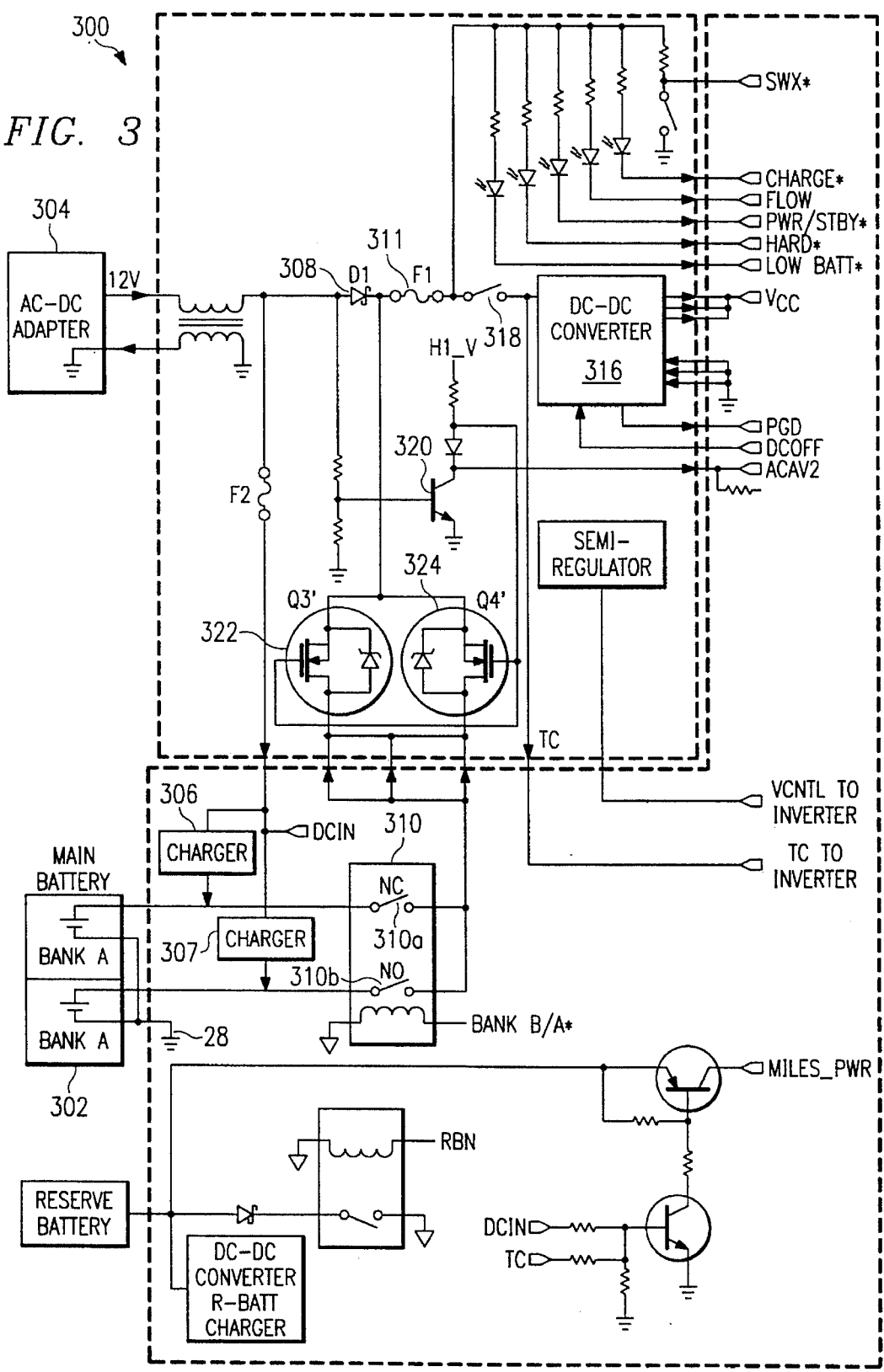
FIG. 3 shows more details of the power-supply and power-control circuitry actually used, in the presently preferred embodiment.

FIG. 2 shows the analog connections used, in the presently preferred embodiment, for monitoring the state of the two battery banks. FIG. 3 shows further details of the power-supply and power-control circuitry in the preferred embodiment.

The power system for any battery powered computer varies quite a bit from a standard desktop computer. The power system used in the presently preferred embodiment is unusual, even for battery powered systems. Power is available from several sources; the main battery, a reserve battery, and an AC to DC adapter which is external to the system. Power from the main battery and the AC to DC converter must be regulated to 5 volts through the DC to DC converter 210. This is located on the System Power Module (SPM, not shown), which is located along the back right hand wall of the case. The ON/OFF switch is also located on the SPM, and protrudes through the plastic case on the right side of the unit. Since the external AC to DC adapter and main battery are on a common node on the input to the DC to DC converter, the battery banks are protected from overcurrent from the AC adapter by diodes D1A and D1B. Diodes D1 can dissipate up to 900 mW at their 2 Amp nominal current draw. A significant dissipation results even when a low voltage drop Schottky Barrier diode is used. In the presently preferred embodiment, this power loss is reduced by shorting diodes D1 with a pair of FETs whenever there is no external power being supplied. (This circuit arrangement, with FET pair Q3' and Q4', may be seen in FIG. 3.)

The battery management circuitry, in the presently preferred embodiment, is centered around a National Semiconductor COP888CF microcontroller (shown as U5 in FIG. 2). This device has 8 analog inputs to an analog to digital converter, 2 timer outputs that can be set up as pulse generators, several digital I/O lines and internal program ROM. The microcontroller monitors both banks of batteries 220A and 220B for the current through, and the voltage of, each string of 7 cells. (In the presently preferred embodiment, each battery bank includes seven KR-1700AE Ni—Cd cells, as shown in FIGS. 4A and 4B.) The microcontroller software applies a very short duty cycle pulse for a period of time to check that the battery is accepting the charge current properly, and is not shorted. Then, when the battery voltage reaches about 7 volts, the pulse width is increased until about 800 mA are being applied.

The microcontroller has a feature called the "Watchdog timer output". Through a fairly safe scheme, this output will generate a pulse on line WPOUT if the microcontroller is not executing its program properly. If this occurs, U6 latches the condition, which tristates U7A and U7B. A pullup on the output causes the gate of Q1A and Q2B to be pulled to ground, shutting the charger's current path off to the battery. This provides a safe condition during reset, and a safe condition in case the microcontroller should fail.

The charge current is regulated through a pulse width modulation scheme in which Q1A and Q1B are switched at a frequency of about 10 kHz. The width of the pulse determines how much average current is allowed to flow through the battery. L1A and L1B are toroidal core inductors that prevent excessive amounts of current to be sourced from the ac adapter. The two diodes D2A and D2B provide negative current to flow through L1A and L1B after Q1A and Q1B are turned off, and the field induced in L1 collapses. Transistors Q3A and Q2A are turned on to allow the gate of Q1A to be pulled to the 21 volt level of the dc to dc converter. Op amp U2A is used as a differential amplifier across RIA (0.01 ohms) to obtain a signal $I_A$ which measures the current from battery bank 220A. The output of U2A is filtered and scaled by U3A, and is read by the microcontroller U5 through one of its analog to digital converter inputs. The pulse width is adjusted by the microcontroller U5 to maintain a constant current of about 800 milliAmps. U3A is also used to filter and prescale the battery voltage measurements, to produce an analog signal $V_A$ to U5. Signals $V_B$ and $I_D$ are similarly generated to measure the voltage and current of the other main battery bank 220B.

Q3 is turned on by the microcontroller pulse through U7 and U8. Turning on Q3 pulls the base of Q2 low, which causes it to conduct, allowing 21 volts to be supplied to the gate of the power FET, Q1. U1 inverts the signal from the microcontroller, turning Q4 off whenever Q3 is on. When the signal from the microcontroller goes inactive (high), the base of Q4 is driven high, causing Q4 to conduct and drain the gate capacitor of Q1 through a small resistor (about 220 ohms) to ground. This allows for a fast turn off and turn on time for the FET (Q1). Keeping Q1 in its non-linear region keeps it from becoming heated, so that no heat sink is needed for these FETs.

FIG. 3. is a schematic block diagram illustrating a battery switching system 300 incorporating features of the present invention. The system 300 is configured for charging two separate battery banks "A" and "B" in a battery pack 302. It is understood that the battery banks A and B each comprise one or more battery cells connected in series. For computer applications, the cells are often packaged in a self-contained, removable pack which comprises each of the banks A and B. In one embodiment, for example, each bank A and B includes a chain of seven (7) size "⅔A" nickel-cadmium (NiCd) cells.

A +12 V voltage source 304 is connected through a fuse 305 to charger circuits 306 and 307. Charger circuit 306 is connected to battery bank A and charger circuit 307 is connected to battery bank B. The negative terminals of battery banks A and B are grounded at 28.

During operation, if AC power is applied to AC-DC adapter 304, DC power is coupled from AC-DC adapter 304 to DC-DC converter 316 through diode 308, fuse 311, and switch 318. As a result of the voltage produced by AC-DC adapter 304, the base of transistor 320 is pulled high, thus causing transistor 320 to turn on. Transistors 322 and 324 are therefore turned off. Since transistors 322 and 324 are turned off, power from battery pack 302 is not coupled through relay 310 and transistors 322 and 324 to DC-DC converter 316. Power for the computer system is thus sourced from the AD-DC adapter 304, and since power is applied to chargers 307 and 308, battery banks A and B may be charged.

When AC power is removed from AC-DC adapter 304, the base of transistor 320 goes low, thus turning off transistor 320. Accordingly, the gates of transistors 322 and 324 are pulled high, thus turning transistors 322 and 324 on. Since transistors 322 and 324 are turned-on, one of the banks A or B of battery pack 302 provides power to DC-DC converter 316 through relay 310 and transistors 322 and 324. As noted from FIG. 3, relay 310 is configured such that a contact switch 310a is normally closed while a contact switch 310b is normally open. The microcontroller U5 of FIG. 2 controls the energization and the de-energization of relay 316 such that the power supplied to DC-DC converter 310 alternatively switches back and forth from battery bank A and battery bank B approximately every four minutes. As a result, maximum charge from battery pack 302 may be attained.

Power-Management Program

The following high-level pseudo-code shows the program structure which is a actually used, in the presently preferred embodiment, for power management.

POWER ON

Perform basic integrity check

Check power switch

If switch on go to NORMAL START

If switch off go to NORMAL CHARGE MODE

NORMAL START

Turn on POWER ON led

Initialize port direction and interrupt registers

Initialize timers

Test for AC Available

Begin Normal Operation MAIN Loop

MAIN—(Normal Operation)
 Monitor—Battery Voltage Standby Switch AC Available System ON switch and blink Charge LED if on Activity Lines (Reset timeouts when active) If Dynamic adjustment enabled reset HD and floppy timeouts during keyboard activity.
TIMER INTERRUPT—5.12 msec.
 Service Watch Dog Timer Register
 Store current battery voltage
 Compare with past for rapid drop detection
 Compare with minimum absolute level
 Compare with warning level
  Test alternate battery before activating alarm and switch batteries if indicated
 Decrement Seconds Timer
  Each Second:
   Decrement timeout counters
    Battery Change
    Hard Disk
    System Sleep
    Backlight Timeout
  If Beeper active
   Decrement pause counter and call BEEP
  Test and debounce standby switch
BATTERY DETECT INTERRUPT
 Switch to reserve battery
 Start 2 minute timeout for system power off
 Turn off LCD to reduce power consumption
 If Floppy and HD not active, put system in standby mode
 Accumulate reserve battery use time (After 1 minute of reserve on time, or one month of operation, the reserve charger will be enabled during the next battery charge cycle. After 2 minutes of use the reserve battery will be charged from the main battery if no AC is available.)
 Monitor BDT* line for new battery installed to terminate function
 Test new battery and switch reserve off if voltage good
BATTERY CHANGE
 Read current battery voltage
 Read target battery voltage
 Switch if alternate is same or higher
LOW-POWER-1 mode
 BEEP for 5 seconds (2 times every second) (COP should enable speaker on low volume if user has it off)
 Turn on LOW BATTERY LED
 Set Low Power 1 Flag
LOW-POWER-2 mode
 BEEP for 5 seconds (2 times every second) (COP should enable speaker on high volume regardless of the user setting)
 Flash LOW BATTERY LED
 Turn off LCD back light
 Set CPU clock to slow speed
 Set Low Power 2 flag
 Enable keyboard interrupt and turn LCD backlight on with any key
 Scan for presence of external power or new battery
LOW-POWER-3 mode
 Place main CPU in standby mode if not already there
 Output continuous beep for 3 seconds
 Save voltage reading for future comparison
 Turn off the power module
POWER ON ALARM (Standby Switch held low for 5 sec or more)
 Exit immediately if external video active
 LCD back light is turned off.
 CPU clock speed goes to slow speed.
 Flash Power On LED indicating Standby mode
 A beep alarm is sounded if operating on batteries. (2 beeps every 4 minutes)
 Monitor the standby switch to determine when the LCD panel is opened to exit this mode.
 Exit standby immediately when the cover is opened.
STAND-BY/RESUME KEY
 Enter and exit standby when button lifted
 CPU clock set to slow speed
 LCD back light is turned off
 CPU is placed in HOLD mode for minimum power consumption
 POWER LED is flashing (0.5 sec on 2 sec off)
 COP pulses the HT21 refresh line to refresh memory Monitor the STAND-BY/RESUME key to exit standby mode
 Exit hold for a fixed period on each timer interrupt to allow system time to be maintained.
 Mask keyboard and mouse interrupts and have COP clear the keyboard controller buffer and restore the interrupt controller mask register before exiting standby.
SLEEP MODE
 Reduce clock speed to slow
 Turn off LCD backlight
 Enable keyboard interrupt
 Monitor system activity (keyboard, ports, and restore full speed if any activity detected
 If inactive for more than 1 minute and AC is available, begin Sleep Charge Mode
 Allow Standby Key press to exit sleep mode
NORMAL CHARGE MODE
 Turn on CHARGE led
 If Reserve Charge Flag set, start reserve charge with 2.5 hour fail safe timeout
 Minimum duty cycle for 3 minutes
 Monitor voltage rise and current
 If max voltage and no current then battery open
 If current rise with no voltage then shorted
 If OK gradually increase current to target value of 750 ma. Start fail safe timeout of 4 hours
 Monitor voltage until it starts to decline or holds constant for xx minutes
 If voltage reaches the power supply maximum then monitor the charge current watching for an increase or a constant value for xx minutes to indicate end of charge
 When end conditions are reached shut off charging current Flash CHARGE led at a low duty cycle when charged
 Wait 0.5 hour with charge off before resuming trickle charge on batteries to allow them to cool off from charge
SLEEP CHARGE MODE
 Turn on CHARGE led
 Minimum duty cycle for 3 minutes
 Monitor voltage rise and current If max voltage and no current then battery open If current rise with no voltage then shorted If OK gradually increase current to target value of xxx ma. Start fail safe timeout of xx hours Monitor voltage until it starts to decline or holds constant for xx minutes If voltage reaches the power supply maximum then monitor the charge current watching for an increase or a constant value for xx minutes to indicate end of charge Exit charge mode and start blink of CHARGE led before system exits sleep mode Flash CHARGE led at a low duty cycle when charged When end conditions are reached shut off charging current

HOST BIOS FUNCTIONS

POST

Reset COP

Checksum MILES SRAM and compare version number

If necessary reload COP program

Start COP

Transfer setup parameters to SRAM and clear CDONE to interrupt COP

Check for proper operation of COP

Set processor to compatibility speed (per SETUP)

Turn on LCD backlight

SWITCH DISPLAYS

Send Display$_{13}$ type command to COP (LCD/CRT)

WAIT FOR KEY (INT 16H function 0)

If no character is available issue a CPU-HOLD command to the COP

SETUP

COP returns status of standby button, etc. to setup

Transfer interrupt mask to be used in standby to COP

Transfer parameters to COP before exiting setup

CTL/ALT/DEL (soft boot)

Place COP in reset before resetting CPU

EXTERNAL PROGRAM INTERFACE

Verify power status before programming Flash Eproms

Enable reserve battery for Flash programming power backup

The Appendix shows a detailed implementation of the COP code to perform these functions, in the presently preferred embodiment. However, the foregoing listing shows the key relations of the preferred program structure.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

The presently preferred embodiments, as discussed above, use Intel microprocessor for the CPU. However, of course, the disclosed innovations can also be applied to systems using other non-Intel microprocessors of comparable architecture. The disclosed innovations can also be applied to other systems using other types of CPU, such as 680x0, SPARC, MIPS, or others. It is contemplated that, in the future, the disclosed innovations can also be applied to systems using a multiprocessor CPU.

The presently preferred embodiment relates to systems used in the ISA architecture. However, it is alternatively possible to adapt at least some of the disclosed teachings to other bus architectures, including not only the EISA bus architecture (which is an extension of ISA), but also the many other buses which are now in use or which may find use in the future.

The presently preferred embodiment uses Headland Technology and VTI chips for CPU support functions. However, of course, a wide variety of other chips are available to perform these functions, and many substitutions are possible. In particular, some microprocessors have been proposed with added support functions on-chip. For another example, compact modules incorporating a microprocessor with peripheral support functions are also available. A huge variety of such substitutions can be made, while still obtaining the benefits of the disclosed inventions.

Of course, many I/O and storage peripherals can be added into a laptop system. The disclosed innovations are generally applicable to such systems, regardless of what peripherals have or have not been added. Thus, for example, a laptop which contains a large bank of NVSRAM, or which is connected to an Ethernet adapter, or which includes speech recognition or synthesis, would still present many power-management issues similar to those discussed above.

For example, the principal disclosed embodiment, as presently practiced, does not include any available expansion slots for the user to add cards into. However, it is contemplated that addition of an expansion bus might be advantageous, and particularly so in combination with the microcontroller power-management architecture described above.

For another example, the principal disclosed embodiment, as presently practiced, never stops the system clock. In the 286 embodiment, the clock is slowed to 250 kHz, and in the SX embodiment the clock is slowed to 2 MHz. A fully static chip set, which would permit the system clock to be stopped would be even more advantageous; but, in the presently preferred embodiment, the HT21 chip and the SX chip are not compatible with fully static operation. Nevertheless, this is an obviously desirable modification, as the appropriate chipsets become available.

For another example, the principal disclosed embodiment, as presently practiced, uses Ni—Cd rechargeable batteries, and a small lithium cell as a non-rechargeable backup battery; but at least some of the disclosed innovative teachings can be practiced with other rechargeable battery technologies (such as NiH cells), if such technologies become commercially practicable, and/or can be practiced with nonrechargeable batteries in place of the NiCds of the preferred embodiment, and/or can be practiced with nonrechargeable batteries other than lithium cells.

The specific relay used in the presently preferred embodiment consumes only 80 mW when active, and thus does not greatly degrade the power budget. In alternative embodiments, a bistable relay could be used for bank-switching, to avoid the on-state power consumption of the relay. Such embodiments would need to include some very reliable way for software to know which bank is currently connected.

As will be recognized by those skilled in the art, the innovative concepts described in the present application can be modified and varied over a tremendous range of applications, and accordingly the scope of patented subject matter is not limited by any of the specific exemplary teachings given.

APPENDIX

A sample source code implementation is set forth, in the following appendix, to ensure the fullest possible compliance with the best mode requirements of US patent law. Although the following code does represent the state of this code as of the effective filing date of the present application, it must be noted that this specific example is still under development. It is expected that this code will later be modified to add functionality, improve performance, and possibly also to remove bugs. Thus, users are warned that the following example should be regarded as an engineering prototype rather than a finished product, and should be used only with great caution. This assembly language code is written for the COP888CF microcontroller.

```
.title COP888, 'Power Management'
.list 07B      ;05B     ;05F lists all macro expansion details for debug +020 for incld
.incld cop888.inc
.incld except.mac
.incld pwrmgmt.inc

;       NAME    PWRMGMT.MAC

;*******************************************************************************
;* Copyright (c) 1990 Dell Computer Corporation, Inc. This program           *
;* contains proprietary and confidential information. All rights reserved    *
;* except as may be permitted by prior written consent.                      *
;*******************************************************************************

;*******************************************************************************
;       Revision Information    $Revision:  1.36  $
;                               $Date:   01 Feb 1991  9:07:00  $
;*******************************************************************************

;
; This program uses the Idle timer of the COP888CF for its time reference.
; At an 8MHz clock this coresponds to a resolution interval of 5.12 msec.
; (4096 counts at .8MHz per timer tick)
;

; This program begins by setting up the ports for direction and
; enabling the watch dog timer.

jp      start
        .byte   'N09'
Start:
        ld      pendng, #00             ;no delayed operations to start
        ld      mode, #0
        ld      crgmde, #0
        ld      flashb, #080
        ld      alrmct, #0
        ld      tdelay, #200            ;1 sec turn on delay
        ld      batcnt, #min1           ;first battery change in 1 minute
```

```
        ld     portcc, #0
        ld     portcd, #0
        ld     portlc, #0
        ld     portld, #0
        ld     portgc, #0
        ld     portgd, #0
        ld     ened, #0              ;Put A/D in low power mode ld     second, #seccnt       ;initialize timeout
        ld     minute, #min1 jsrl   xsump                 ;test the validity of the current params
        ifeq   a, xsumpd
        jp     sysok ld     systim, #min4         ;set default values
        ld     hdtim, #min4
        ld     lcdtim, #min4
        ld     sysbyt, #02F
sysok:
        jsr    stmout                ;set the initial timeouts ld     portcd, #01C          ;initial C port data
        ld     portcc, #01F          ;make C0 and C1 - C4 outputs
        ld     b, #oplow
        ld     [b], #0
        jsr    putlow
        ld     b, #ophigh
        ld     [b], #ampson+fetoff   ;Start at high speed, video off, opamps on
        jsr    puthi                 ;This is to get around powerup
                                     ; problem with MILES
        jsr    dely50                ;Wait 50 msec for power to go away
        rbit   5, icntrl             ;clear the T0 overflow bit
        setbit hdcs0, wkedg          ;Look for low going edges
        jsr    cksram                ;check sram parameters
        jsr    ckrbat                ;test reserve
        bitif  syson, portgp        ;Is the power switch on?
        jp     nstart                ; Yes, then normal start sequence
        clrbit syson, flashb   ;**

bitif  acav, portcp          ;Next test for AC power
```

```
            jmp      spmoff                  ; Shouldn't be here if no AC ld       portcd, #01C            ;initial C port data
            ld       portcc, #017            ;make C0 - C2 outputs
            jsrl     c20off                  ;turn off video
            jsrl     stchrg                  ;start the charger
            sbit     4, icntrl               ;enable T0 interrupt
            jmp      cmain                   ;main loop for charge
nstart:
            clrbit   pwrled, portcd          ;turn on power LED
            setbit   syson, flashb   ;**
            jsrl     c20on                   ;turn on video
            jsr      vinit                   ;initialize voltage readings
            jsr      dlypmd                  ;reset power monitoring mode
            ld       wkpnd, #0               ;clear any pending interrupts
            setbit   bdt, wken               ;enable battery detect interrupt
;**         setbit   kbdint, wken
            sbit     4,icntrl                ;enable T0 interrupt
            sbit     6,icntrl                ;enable L port wakeup interrupt
            sbit     1,psw                   ; enable external interrupt
main:
            sbit     0, psw                  ;global interrupt enable
            nop                              ;service all interrupts now
            nop
            nop
            rbit     0, psw                  ; now turn them back off
            bitif    syson, portgp           ;Monitor system switch
            jp       main00
            bitif    bdt, mode               ;are we waiting for a new battery?
            jmp      reslop                  ;wait for new battery
            jmp      reset
main00:
            bitif    acav, portcp            ;test for ac available
            jp       main10                  ; if operating from batteries
            jsr      clrlob
            bitif    chrgrb, crgmde          ;if reserve battery being charged
            jp       main01                  ; don't turn on trickle charger
            bitif    trklec, crgmde          ;Allow trickle charge when AC available
            jp       main01                  ; if already set
            bitif    charge, crgmde          ;** remove for production
            jp       main01                  ;**
```

```
         jsr     trklon          ;start trickle charge
main01:
         jp      main
main10:
         bitif   trklec, crgmde  ;only true if AC adapter just unpluged
         jsr     trklof          ; turn off trickle charge
         bitif   bdt, mode       ;are we waiting for a new battery?
         jmp     reslop          ;wait for new battery before testing voltage
         bitif   lobat3, mode    ;are we about to shut down system?
         jmp     lo3lop          ;then wait for AC or new battery
         jmp     main            ;wait before measuring batteries cksm00:
         laid
         ret ;
; The cop888cf has a vectored interrupt scheme. On an interrupt
; the program branches to the instruction at 0FFh. The program can
; then save the appropriate registers and issue a VIS instruction
; to branch to the interrupt handler.
;
         .=0ff ; This routine saves the contents of A, B, and X on entry to an interrupt
; and restores them on exit.

push    a               ;this is the only register we can save on stack
         x       a,b             ;move contents of b to a
         ld      b,#saveb        ;point to location to save B and X
         x       a,[b+]          ;save contents of original B register
         x       a,x             ;get contents of X register
         x       a,[b]           ;and save in data ram
         vis
restor:
         ld      b,#savex        ;point to location of saved X register
         x       a,[b-]          ;get old X contents
         x       a,x             ;and put back in X
         x       a,[b]           ;now get the saved contents of B
         x       a,b             ;and put it back in B
         pop     a               ;now we're back where we started
```

```
        reti
;
; Timer T0 underflow interrupt vector
;
timer0:
        ld      wdcnt, #009     ;service watch dog 2-65K window, clock monitor on
        jsr     tstac
        bitif   syson, flashb   ;is the cpu operating
        jp      tim00
        jp      tim01           ; if not skip standby and refresh
tim00:
        bitif   hldreq, mode    ;test for cpu in hold
        jsr     refrsh          ; and do refresh if so
        jsr     tststb          ; then check for activation
        bitif   hldreq, mode    ;are we in standby mode
        jsr     flashp          ; then flash the power led
        bitif   lobat2, mode    ;is the battery low
        jsr     flshlb          ; then flash the low bat led
        ifeq    pendng, #0      ;test for hd routine pending
        jp      tim01
        jsrl    iowlf7          ;test hd busy status
tim01:
        drsz    second          ;decrement seconds timer
        jp      t0exit          ;exit if not zero
        jsr     deccnt          ;executed once every second
t0exit:
        bitif   bdt, mode
        jp      tim02           ;skip if waiting for battery
        ifeq    tdelay, #0      ;test new battery delay
        jp      tim02
        drsz    tdelay
        jp      tim02           ;wait to initialize
        jsr     resoff          ; then reset voltage readings
tim02:
        bitif   bdt, mode       ;test for operation on reserve
        jsr     tstnew          ; look for a new battery
        bitif   cngoff, crgmde  ;Have we switched batteries
        jsr     resoff          ; then turn off the reserve battery
        bitif   cngben, crgmde  ;Is battery change enabled?
        jsr     docngb          ; then actually switch the battery banks
        rbit    5,icntrl
```

```
        jmp     restor
;
; Software interrupt vector
;
reserv:                         ;***** TEMPORARY ******
swivec:
        jsr     tog             ;Light all the LED's
        jp      .               ;**
        rpnd
        jmp     reset ;
; Decrement the various timeout counters
;
deccnt:
        ld      second, #seccnt ;reset the seconds counter
        bitif   bdt, mode       ;are we operating on reserve?
        jsr     incrti          ; then increment reserve operation time
        drsz    minute          ;decrement the minute counter
        jp      dec01           ; until the minute is up
        bitif   bdt, mode       ;one minute on reserve battery?
        jmp     spmoff          ; then turn off system
        bitif   lobat3, mode    ;10 seconds at cutoff level?
        jmp     spmoff          ; then turn off system
        jsr     decmin          ; then do our once a minute stuff
dec01:
        bitif   stdeb2, flashb  ;We don't need to look unless switch is down
        jsr     tstpoa          ;check for case closed
        jsr     readed          ;make new readings once per second
        bitif   charge, crgmde  ;are we charging the batteries?
        jmp     adjcrg          ; if so then check for end, etc.
        ld      a, sysbyt       ;to speed up checks bitif   acav, portcp    ;test for ac available
        jp      dec02           ;jmp if no AC
        bitif   acovrd, a       ;test for AC override
        jmp     stmout          ; and reset timeout counters if active
dec02:
        bitif   hdsec, a        ;is the hd timeout in seconds?
        jsr     rldhdc          ;reset the hard disk timeout
        ld      a, sysbyt       ;to speed up checks
```

```
        bitif   lcdsec, a       ;is lcd T.O. in seconds
        jsr     rldlcd
        ld      a, sysbyt       ;to speed up checks
        bitif   syssec, a       ;is system T.O. in seconds
        jsr     rldsys bitif   acav, portcp    ;test for ac available
        jp      dec03           ;jmp if no AC
        ld      batcnt,.#min4   ;reset battery timer and don't switch
        ret                     ; if plugged in to AC adapter
dec03:
        ifeq    tdelay, #0      ;don't test batteries until after delay
        jsr     chklow
        drsz    batcnt          ;# of seconds to change batteries
        ret
        jsr     cngbat
        ret                     ; to allow for a skip return if no error
        ret decmin:
        ld      minute, #min1   ;reset the minute counter
        bitif   charge, crgmde  ;are we charging the batteries?
        jmp     tstend          ; if so then check for end, etc.
        bitif   chrgrb, crgmde  ;are we charging the reserve battery?
        jsr     tstres          ; if so then test for -dV ld      a, sysbyt       ;to speed up checks bitif   acav, portcp    ;test for ac available
        jp      min00           ;jmp if no AC
        bitif   acovrd, a       ;test for AC override
        jmp     stmout          ; and reset timeout counters if active
min00:
        bitif   hdsec, a        ;is the hd timeout in seconds?
        jp      min01
        jsr     rldhdc          ;reset the hard disk timeout
min01:
        ld      a, sysbyt       ;to speed up checks
        bitif   lcdsec, a       ;is lcd T.O. in seconds
        jp      min02
        jsr     rldlcd
```

```
min02:
        ld      a, sysbyt       ;to speed up checks
        bitif   syssec, a       ;is system T.O. in seconds
        ret
        jmp     rldays ;
; The interrupt vector table starts from the lowest priority vector
; which is the VIS default address and goes down to the highest
; priority vector, the software interrupt.
;
        .=01e0
        .addrw  visvec          ;Default VIS routine must not do a RETI
        .addrw  wakeup          ;Port L Wakeup interrupt
        .addrw  reserv          ;Timer 3 this should never occur
        .addrw  reserv          ;Timer 3 this should never occur
        .addrw  time2b
        .addrw  time2a
        .addrw  reserv          ;UART this should never occur
        .addrw  reserv          ;UART this should never occur
        .addrw  reserv          ;TBD this should never occur
        .addrw  microw          ;Microwire BUSY Low
        .addrw  time1b
        .addrw  time1a
        .addrw  timer0          ;Idle timer
        .addrw  extirq          ;Host CPU IRQ (CDONE)
        .addrw  reserv          ;NMI interrupt is reserved
        .addrw  swivec          ;Software interrupt (illegal instruction)
;
; Multi input wake-up/port L interrupt vector
;
wakeup:
        ld      b, #wkpnd
        bitif   bdt, [b]        ;test for battery interrupt
        jsr     resvon          ; switch on the reserve bat
        bitif   bdt, mode       ;if reserve battery active
        jmp     restor          ; then dont check anything else
        bitif   hldreq, mode    ;are we in hold
        jp      wake00          ; then skip some tests
        bitif   vramcs, wkpnd   ;test for activity
        jsr     tstvid
```

```
wake00:
;       bitif   slpmde, mode            ;is the processor asleep?
;       jp      wake01
;       jmp     restor                  ; if not then cancel tests
wake01:
        bitif   kbdint, wkpnd           ;exit on keyboard interrupt
        jsr     hldoff                  ;***
        bitif   cpuint, wkpnd           ;is cpu interrupt active
        jsr     shrton                  ; turn on for 50 usec
        jmp     restor ;
; Default VIS vector
;
visvec:
;       jmp     tog
        jsr     tog1
        jmp     start
;
; Microwire/plus busy low interrupt vector
;
microw:
        rbit    3,lcntrl
        jmp     restor
;
; Timer T2 T2B interrupt vector
;
time2b:
        ld      b, #ophigh
        clrbit  speakr, [b]     ;turn off the speaker
        jsr     puthi
        rbit    1,t2cntrl
        jmp     restor
;
; Timer T2 T2A/underflow interrupt vector
;
time2a:
        ld      b, #ophigh
        setbit  speakr, [b]     ;turn the speaker on
        jsr     puthi
        rbit    3,t2cntrl
```

```
        jmp     restor
;
; Timer T1 T1B interrupt vector
;
time1b:
        jsr     t1off
        jsr     t2off
        rbit    0, icntrl       ;disable interrupts until the next beep
        rbit    1, icntrl
        jmp     restor
;
; Timer T1 T1A/underflow interrupt vector
;
time1a:
        rbit    5,psw
        jmp     restor tstac:
        bitif   syson, portgp   ;is power good true
        jp      tstflg          ; then make sure we know it
        bitif   syson, flashb   ;power is off, but
        jmp     reset           ; if we're here the cop doesnt know it's off
        ret
tstflg:
        bitif   syson, flashb   ;does the cop know we're on
        ret                     ; yes so just return
        jmp     reset           ; restart if cop thinks we're off cmain:
        bitif   syson, portgp   ;Monitor system switch
        jmp     reset
        bitif   acav, portcp    ;Next test for AC power
        jmp     copoff          ; Stop system if no AC bitif   bdt, portlp     ;test for new battery
        jsr     waitb           ; and start over
        sbit    0, psw          ;global interrupt enable
        nop                     ;service all interrupts now
        nop
        nop
        rbit    0, psw          ; now turn them back off
```

```
        jp      cmain waitb:
        jsr     acrgof          ;turn off A bat charger
        jsr     bcrgof          ;turn off B bat charger
        jmpl    stcrg1          ;test for new battery and restart if available chklow:
        jsr     avrage          ;use running average for voltages
        bitif   bankb, oplow    ;test for current bank
        jmp     tbmin           ; if bank B
        ld      a, batav        ;get the A bank voltage
        ifgt    a, #vterm       ; and test for cutoff value
        jp      chk00
toolow:
        jsr     cngbat          ;try to change batteries
        nop                     ;**
;       jmp     spmoff          ;kill power if other battery is bad
        jsrl    stndby          ;put system in lowest power mode
        clrbit  kbdint, wken    ; and don't allow keypress to exit
        setbit  lobat3, mode    ;wait 10 sec for new battery or AC
        ld      minute, #min1/6 ;reset the minute counter for termination
        jmp     stbeep          ;beep and prepare to turn off chk00:
        ld      b, #bavmin
        x       a, [b]          ;store the new "minimum"
        ifgt    a, [b]          ;is it really less
        jp      tbmax           ; if so continue
        x       a, [b]          ; else restore the old value
tbmax:
        ld      a, batbv        ;now read bank B's voltage
        ld      b, #bbvmax      ; and look for a maximum
        x       a, [b]          ;store the new maximum
        ifgt    a, [b]          ;is old value greater than new
        x       a, [b]          ; then put it back
tstdlt:
        ld      b, #bavmax      ;point to highest bat A voltage
        ld      a, [b+]
        sc                      ;for subtraction
        subc    a, [b]          ;calculate the delta
```

```
        bitif   lobat1, mode    ;are we already in low bat mode
        jp      tstdl2          ; then test for second delta
        ifgt    a, #lb1dlt      ;is it greater than cutoff?
        jp      lowbt1          ;then warn user
        ld      a, [b+]         ; otherwise increment b
        ld      a, [b+]         ;to test bank B
        sc
        subc    a, [b]
        ifgt    a, #lb1dlt
        jp      lowbt1
        ret tstdl2:
        ifgt    a, #lb2dlt      ;is it greater than cutoff?
        jp      lowbt2          ;then warn user
        ld      a, [b+]         ; otherwise increment b
        ld      a, [b+]         ;to test bank B
        sc
        subc    a, [b]
        ifgt    a, #lb2dlt
        jp      lowbt2
        ret lowbt1:
        setbit  lobat1, mode
        ld      b, #oplow
        setbit  lowbat, [b]     ;turn on the low bat LED
        jmp     putlow lowbt2:
        bitif   lobat2, mode    ;are we already in lobat2 mode
        ret                     ;then just return
        setbit  lobat2, mode
        jsrl    stndby
        ld      avcnst, #1      ;to start flashing
        ret tbmin:
        ld      a, batbv        ;get the B bank voltage
        ifgt    a, #vterm       ; and test for cutoff value
```

```
        jp      chk01
        jmp     toolow chk01:
        ld      b, #bbvmin
        x       a, [b]          ;store the new "minimum"
        ifgt    a, [b]          ;is it really less
        jp      tamax           ; if so continue
        x       a, [b]          ; else restore the old value
tamax:
        ld      a, batav        ;now read bank A's voltage
        ld      b, #bavmax      ; and look for a maximum
        x       a, [b]          ;store the new maximum
        ifgt    a, [b]          ;is old value greater than new
        x       a, [b]          ; then put it back
        jmp     tstdlt          ;test for delta V readan:
        ld      enad, #04       ;setup to read battery A's voltage
        nop                     ;Time delay to complete conversion
        nop
        nop
getrdg:
        nop
        nop
        nop
        nop
        nop
        ld      a, adrslt       ;read A/D
        ld      enad, #0        ;Put A/D in low power mode
        ret readbn:
        ld      enad, #044      ;setup to read battery B's voltage
        jp      getrdg          ;takes 3 clock cycles ; CHKBAT determines which battery is currently selected and then reads
; the battery voltage. The voltage is returned in A. No other registers
; are disturbed.

chkbat:
```

```
        ld      a, #04          ;set single & divide by 6
        bitif   bankb, oplow    ;if on bank B
        or      a, #040          ; setup to read battery B's voltage
        x       a, enad         ;and enable A/D converter
        nop                     ;Time delay to complete conversion
        nop
        nop
        nop
        nop
        nop
        nop
        nop
        ld      a, adrslt       ;read A/D
        ld      enad, #0        ;Put A/D in low power mode
        ret reslop:
        sbit    0, psw          ;global interrupt enable
        nop                     ;service all interrupts now
        nop
        nop
        rbit    0, psw          ; now turn them back off
        bitif   acav, portcp    ;test for AC adapter
        jp      res00           ; if operating from batteries
        jsr     tstn03          ;reenable normal operation
        jmp     main
res00:
        bitif   bdt, mode       ;wait for bdt to clear
        jp      reslop          ; until battery inserted
        ifeq    tdelay, #0
        jp      res01
        jmp     reslop          ;wait before measuring batteries
res01:
        jsr     tbgood          ;next test for good battery
        jp      nogood
        jmp     main            ;start over with good battery nogood:
        setbit  lobat3, mode    ;wait 10 sec for new battery or AC
        ld      minute, #min1/6 ;reset the minute counter for termination
```

```
            jsr     stbeep          ;beep and prepare to turn off
            jmp     main lo3lop:
            bitif   acav, portcp    ;test for AC adapter
            jp      lo300           ; until AC plugged in
            jsr     tstn03          ;reenable normal operation
            jmp     main
lo300:
            bitif   bdt, mode       ;check for battery presence &
            jmp     main
            jp      lo3lop          ; wait until battery removed or AC plugged in clrlob:
            jsr     lblof0
            ld      b, #mode        ;This is the same number of bytes and one
            bitif   lobat3, [b]     ; less clock than testing mode directly
            jsr     hldoff
            ld      b, #mode
            bitif   lobat2, [b]
            jsr     hldoff
            ld      b, #mode
            clrbit  lobat3, [b]
            clrbit  lobat2, [b]
            clrbit  lobat1, [b]
            ret ; TSTPOA tests to see if the case is closed and flashes led's or beeps
; accordingly.

tstpoa:
            ld      a, alrmct       ;get number of seconds switch is down
            ifgt    a, #poasec      ;more than 5 seconds
            jp      closed          ; then case must be closed
            inc     a
            x       a, alrmct       ;increment count
            ret closed:
            setbit  poa, flashb     ;set case closed flag
```

```
        bitif   #cav, portcp    ;test for ac available
        jp      clos00          ; continue if no AC
        jsr     dspof0          ;turn off LCD if case closed,
        clrbit  posbep, flashb  ; but no alarm if AC present
        ret
clos00:
        bitif   crton, flashb   ;is the crt in use
        ret                     ; then don't beep
        bitif   posbep, flashb
        ret                     ;if already in standby, don't do it again
        jsrl    stndby          ;put system in standby mode and
        setbit  posbep, flashb  ; if on batteries then beep
        jsr     stbeep
        ret clrbdt:
        clrbit  bdt, wkpnd      ;make sure interrupt is clear clrbsy:
        ld      b, #oplow       ; clear io latch
        setbit  csclr, [b]      ; first write bit high
        jsr     putlow
        ld      b, #oplow
        clrbit  csclr, [b]      ; and then low again
        jmp     putlow stmout:
        ld      b, #syscnt
        ld      x, #systim
        ld      cnt, #3
initl:
        ld      a, [x+]         ;set the initial timeouts
        x       a, [b+]
        drsz    cnt
        jp      initl
        ret dlypmd:
        ld      tdelay, #200    ;delay 1 second for battery to stabalize
rstpmd:
        jsr     vinit
```

```
        ld      a, batav
        ld      b, #bavmax          ;point to start of table
        x       a, [b]              ; and set max and min to current
        ld      a, [b+]             ; readings
        x       a, [b+]
        ld      a, batbv
        x       a, [b]
        ld      a, [b+]
        x       a, [b]
        ret vinit:
        jsr     readed              ;setup the running average array
        jsr     readed              ; this is slower than doing only
        jsr     readed              ; the readings we need, but we only
        jsr     readed              ; do it once in a while
        jsr     readed
        jsr     readed
        jsr     readed
        jsr     readed
        jmp     avrage reset:
        ld      psw, #0             ;turn off all potential interrupts
        ld      icntrl, #0
        ld      cntrl, #0
        ld      t2cntrl, #0
;       jsr     dspsp               ;** debug
        ld      sp, #06F
        jmp     start ; REFRSH will output a stream of refresh pulses every 5.12 msec when
; the COP has the cpu in hold
;

refrsh:
        ld      b, #portcd
        setbit  rfresh, [b]
        setbit  rfresh, portcc      ;enable output only during refresh
        ld      cnt, #41            ;to average 1 refresh every 125 usec.
        bitif   s386, sysbyt        ; different refresh for 286 than 386
```

```
        jp      reflop          ; do 386 refresh
ref286:
        clrbit  rfresh, [b]     ; otherwise do 286
        jsr     delay1          ;to make 13.75 usec pulse
        nop                     ; stretch it out to 20 usec.
        nop
        nop
        nop
        nop
        nop
        setbit  rfresh, [b]
        jsr     delay1          ;to make 22.5 usec delay before next pulse
        drsz    cnt
        jp      ref286
        jp      refext          ;to turn off portc reflop:
        clrbit  rfresh, [b]
        nop                     ;to make 2.5 usec pulse
        nop                     ;one more for good measure
        setbit  rfresh, [b]
        drsz    cnt
        jp      reflop
refext:
        clrbit  rfresh, portcc  ;disable as soon as refresh is done
        clrbit  rfresh, [b]
        ret dsplon:
        clrbit  crton, flashb   ;indicate lcd active
dspon0:
        clrbit  vramcs, wken    ;disable wakeup on video activity
        clrbit  vramcs, wkpnd
        ld      b, #oplow       ;now the low byte
        setbit  vddon, [b]      ; to turn on the +5v to the LCD
        setbit  lcdon, [b]      ; to turn on the backlight inverter
        jp      putlow          ;do it and return to caller ; HSPEED and LSPEED are used to switch the processor speed by
; toggling the HIGHSPEED* line (OP 13) on MILES hspeed:
```

```
        ld      b, #ophigh          ; point to contents of OP high byte
        clrbit  hispd, [b]          ; low for max clock speed
        jp      puthi               ; output to OP register lspeed:
        ld      b, #ophigh          ; point to contents of OP high byte
        setbit  hispd, [b]          ; set bit high for 1/2 clock speed
        jp      puthi               ; output to OP register dsplof:
        setbit  crton, flashb       ;indicate crt active
dspof0:
        ld      b, #oplow           ;set the OP low byte
        clrbit  lcdon, [b]          ; to turn off the backlight inverter
        clrbit  vddon, [b]          ; to turn off the +5v to the LCD
;       jp      putlow              ; before the LCD controller ;
;       PUTLOW / PUTHI
;
; These routines write a byte pointed to by the B register to the MILES
; OP Low byte or OP High byte registers respectively
;
putlow:
        clrbit  milsad, portcd      ;C0 = 0
        jp      put
puthi:
        setbit  milsad, portcd      ;C0 = 1
put:
        ld      a, [b]
        x       a, portd            ;put the value in port D
        ld      b, #portcd          ;point to port C for faster access
        setbit  milstb, [b]         ;toggle c1 to a 1
        clrbit  milstb, [b]         ;reset to 0 to latch data
;       pop     a                   ;recover the flags
;       x       a, psw              ; and restore them
        ret ;
; HLDOFF restores the processor to full speed operation
;
```

```
hldoff:
        bitif   hldreq, mode            ;Are we in hold mode?
        jp      hld00                   ; yes then turn cpu back on
        jp      hld01                   ; no then just exit sleep
; first set IO_M- to IO in OPH
hld00:
        ld      b, #ophigh              ;point to the op register data storage
        setbit  iom, [b]                ; 0 port data = 10000000 for IO
        jsr     puthi ld      b, #oplow               ;restore normal value
        clrbit  drq5, [b]
        clrbit  master, [b]
        jsr     putlow
        clrbit  hldreq, mode            ;clear the flag
hld01:
        jsrl    c20on                   ;turn on the crt controller
        bitif   poa, flashb             ;don't turn on if case closed
        jp      hld00
        bitif   crton, flashb           ; or the crt is active
        jp      hld02
        jsr     dspon0                  ;turn on the display
hld02:
        jsrl    endslp                  ;exit sleep mode
        bitif   charge, crgmde  ;**     ;are we charging
        jp      hld03
        jsr     stmout                  ;reload the timeout counters
hld03:
        clrbit  pwrled, portcd         ;turn the power/standby led on
        clrbit  kbdint, wkpnd          ;clear keyboard interrupt
        clrbit  kbdint, wken           ;turn off wakeup enable **********
        clrbit  cpuint, wken
        clrbit  cpuint, wkpnd
; now set IO_M- to M in OPH
        ld      b, #ophigh              ;point to the op register data storage
        clrbit  iom, [b]                ;point to memory
        jmp     puthi                   ; and return ;
; RESVON turns on the reserve battery if the main battery is removed
;       On Entry B points to WKPND
```

```
;
resvon:
        bitif   acav, portcp            ;test for ac available
        jp      resv01                  ;only turn on if no AC
        clrbit  bdt, [b]                ;clear the interrupt
        setbit  rbin, portcd            ; make sure the reserve is off ;**
        ret
resv01:
        ld      minute, #min4/2         ;reset the minute counter for termination
        setbit  bdt, mode               ;set flag for new bat test
        clrbit  rbin, portcd            ;turn on reserve battery
        ld      [b], #0                 ;clear all the pending interrupts
        jsrl    stndby                  ;enter standby mode and
        clrbit  kbdint, wken            ; only exit on new battery or acav
;**     setbit  cpuint, wken
;       jsr     ratpmd
        ld      b, #ophigh
        clrbit  iom, [b]                ;make sure we're set to memory cycle
        jsr     puthi
        ld      a, #L(sresdi)           ;get # of times reserve has been activated
        jsrl    m1e00
        inc     a
        x       a, portd
        except  sramw, sresdi           ;save the count
        ifeq    portd, #0               ;did we wrap
        jsr     incrdi                  ;then increment upper byte
        ld      tdelay, #20             ;debounce delay
        ret ; TSTNEW monitors the bdt line watching for a new battery to be installed tstnew:
        jsr     clrbsy                  ;try to reset bat detect bit
        bitif   acav, portcp            ;did user plug in AC adapter?
        jp      tstn00                  ; no then continue
        jp      tstn01                  ; yes then cancel standby after delay
tstn00:
        bitif   bdt, portlp             ;check for battery presence
        jp      setdly                  ; none yet
tstn01:
        drsz    tdelay                  ;debounce time
```

```
        ret
tstn03:
        setbit  rbin, portcd         ;turn off reserve battery
        jsr     clrlob
        clrbit  bdt, [b]             ;CLRLOB sets B to point to MODE
;**     setbit  kbdint, wken         ; reenable keyboard interrupt
        jsr     dlypmd               ;initialize min and max for new bat
        jmp     hldoff               ;exit standby mode
setdly:
        ld      tdelay, #20          ; 100 msec debounce
        ret ; TBGOOD tests the new battery to see if it is above minimum voltage
; and skips the next instruction on return if the battery is good tbgood:
        bitif   acav, portcp         ;If AC plugged in then
        jp      tbg00
        retsk                        ;always return good
tbg00:
        jsr     chkbat               ;Then test new battery
        bitif   lobat2, mode         ;** possibly eliminate           **
        jp      tbgd2                ;** and require all new to be v+10 **
        ifgt    a, #vterm+1          ; must be above minimum
        retsk jsr     cngbat               ; if not try the other battery
        ret                          ;we can only get here if both
                                     ;banks are bad and no AC is available jsr     chkbat               ;read voltage on second bank
        ifgt    a, #vterm+1          ; above minimum?
        retsk                        ;start over with good battery
        ret tbgd2:
        ifgt    a, #vterm+10         ; allow at least 10 minutes operation
        retsk jsr     cngbat               ; if not try the other battery
        ret                          ;we can only get here if both
```

```
                        ;banks are bad and no AC is available
        jsr    chkbat   ;read voltage on second bank
        ifgt   a, #vterm+10  ; allow at least 10 minutes operation
        retsk           ;start over with good battery
        ret incrdi:
        ld     a, #L(sresdi+1)   ;get # of times reserve has been charged
        jsrl   m1e00
        inc    a
        x      a, portd
        except srasw, sresdi+1   ;save the count
        ret tstvid:
        bitif  vramcs, wken   ;is test for activity enabled?
        jp     vid00
        clrbit vramcs, wkpnd
        ret                   ; if not active
vid00:
        bitif  hldreq, mode   ;are we in standby mode
        ret                   ; if so then return
        bitif  crton, flashb
        jp     rstlcd
        jsr    dspon0         ;else make sure display is on
        jp     rstlcd rldlcd:
        bitif  vramcs, wkpnd  ;test for activity
        jp     rstlcd         ;if active
        ifeq   lcdcnt, #0     ;no timeouts if zero count
        ret
        bitif  crton, flashb  ;is the LCD or CRT active
        ret                   ; if CRT
        drsz   lcdcnt         ; else decrement counter
        ret                   ; and return
        setbit vramcs, wken   ;enable wakeup on video activity
        clrbit kbdint, wkpnd
        setbit kbdint, wken   ; or a keypress
        jmp    dspof0         ;turn off display backlight & LCD
```

```
rstlcd:
        ld      a, lcdtim
        x       a, lcdcnt       ;reset the lcd counter
        clrbit  vramcs, wkpnd
        jp      sysrst rldhdc:
        bitif   hdcs0, wkpnd    ;test for activity on hard disk
        jp      rsthd           ;if there is activity
        ifeq    hdcnt, #0       ;no timeouts if zero count
        ret
        drsz    hdcnt           ; else dcrement counter
        ret                     ; and return
        jmpl    drvof1          ;when we decrement to zero
rsthd:
        ld      a, hdtim        ;reset the timeout from system setting
        x       a, hdcnt
        clrbit  hdcs0, wkpnd
sysrst:
        ld      a, systim       ;reset system timeout if anything active
        x       a, syscnt
        clrbit  kbdint, wkpnd
        jmp     clrbsy          ;to clear out I/O activity flag rldsys:
        bitif   kbdint, wkpnd   ;test keyboard
        jp      sysrst
        bitif   ioact, portgp   ;test for any active I/O devices
        jp      sysrst
        ifeq    syscnt, #0      ;no timeouts if zero count
        ret
        drsz    syscnt
        ret                     ;if nothing active
        jsrl    drvof1              ;turn off the drive
        jsr     dspof0              ;turn off the display
        setbit  vramcs, wken    ;enable wakeup on video activity
;       setbit  hdcs0, wken     ; or hard disk activity
        jmpl    sleep ; READAD reads the A/D channels and maintains the last 8 values of each
; voltage and charge current in an array starting at location AVSAVE
```

```
readad:
        rc
        ld      enad, #04           ;Single conversion, divide by 6
        ld      b, #enad
        ld      x, #debug           ;use the debug location to pass readings
adloop:
        ld      a, [b]              ;get the enable command
        adc     a, #020             ;bump to the next channel
        x       a, [b+]             ; and start the next conversion
        ld      a, [b-]             ;read the previous result
        x       a, [x+]             ; and store it
        ifnc                        ;test for overflow
        jp      adloop              ; and continue till done
        ld      enad, #0            ;Put A/D in low power mode bitif   charge, crgmde      ;Are we charging the batteries?
        jsr     readv               ; then turn off charge and reread voltage
;       jsr     forcer ; Update arrays with latest readings ld      x, #debug           ;address of A/D value array
        ld      b, #avsave          ;pointer to 1st element for A Batt
        ld      cnt, #5
update:
        ld      a, [x+]             ;get a reading
        jsr     rotate              ; and add it to the array
        drsz    cnt
        jp      update
        ld      cnt, #3             ;now do the discharge currents
        ld      b, #batrc
uploop:
        ld      a, [x+]             ;get the A current
        x       a, [b+]             ; and save it
        drsz    cnt
        jp      uploop
        ret forcer:
        ld      b, #debug
        clr     a
```

```
             ld     cnt, #8
forlop:
             x      a, [b]
             ld     a, [b+]
             inc    a
             drsz   cnt
             jp     forlop
             ret ; AVRAGE averages the last 8 readings for each battery voltage and
;  charge current and stores the 8 bit values in a table
;
avrage:
             ld     x, #avsave          ;point to the first set of 8 readings
             ld     b, #avwork          ;16 bit workspace
             jsr    avr
             x      a, batav            ;average battery A voltage
             jsr    avr
             x      a, bacrg            ;average batt A charge current
             jsr    avr
             x      a, batbv            ;average battery B voltage
             jsr    avr
             x      a, bbcrg            ;average batt B charge current
             jsr    avr
             x      a, batrv            ;average reserve battery voltage
             ret avr:
             clr    a
             x      a, [b+]             ;clear the work area
             clr    a
             x      a, [b-]
             rc
             ld     cnt, #8
avloop:
             ld     a, [x+]             ;get the next reading
             adc    a, [b]              ; and add in the accumulated value
             x      a, [b+]             ; save
             clr    a                   ;get a zero
             adc    a, [b]              ; and add in the carry and clear it
```

```
        x       a, [b-]             ; and save
        drsz    cnt
        jp      avloop ld      cnt, #3             ;setup for the shift operation
        ld      a, [b+]             ;increment b to point to avwork+1
sftlop:
        ld      a, [b]              ;it's more efficient to do it always
        rrc     a                   ; rather than a test and skip
        x       a, [b-]             ;restore the shifted value
        ld      a, [b]              ;now get the LSB
        rrc     a                   ; and shift it as well
        x       a, [b+]
        drsz    cnt
        jp      sftlop              ;three times for divide by 8 ld      a, [b-]             ;point back to avwork
        ld      a, [b]              ;get the average value for return
        ret ; WRITAD returns the A/D values starting at 1F81h
;
;       1F81 - Bank A voltage
;       1F82 - Bank A charge current
;       1F83 - Bank B voltage
;       1F84 - Bank B charge current
;       1F85 - Reserve battery voltage
;       1F86 - Reserve battery discharge current
;       1F87 - Bank A discharge current
;       1F88 - Bank B discharge current writad:
;       ld      b, #batbc           ;point to the data
        ld      b, #debug+7         ;point to the data
        ld      x, #portd writ8p:                             ;write the parameters to SRAM
        ld      a, [b-]             ;get the last parameter
        x       a, [x]
        except  sram 01F88          ; and write in reverse order
        ld      a, [b-]
```

```
          x       a, [x]
          except  sramw 01F87
          ld      a, [b-]
          x       a, [x]
          except  sramw 01F86
          ld      a, [b-]
          x       a, [x]
          except  sramw 01F85
writ4p:
          ld      a, [b-]
          x       a, [x]
          except  sramw 01F84
          ld      a, [b-]
          x       a, [x]
          except  sramw 01F83
          ld      a, [b-]
          x       a, [x]
          except  sramw 01F82
          ld      a, [b]
          x       a, [x]
          except  sramw 01F81
          ret ; READV momentairly turns off the charger and rereads the battery voltages readv:
          bitif   chrgb, crgmde      ;is timer 1 on?
          jsr     t1off
          bitif   chrga, crgmde      ;test timer 2 also
          jsr     t2off
          bitif   chrgrb, crgmde     ;Is reserve battery being charged?
          jsr     rbcoff
          ld      enad, #04          ;start voltage reading for A batt
          ld      b, #enad
          ld      x, #debug          ;use the debug location to pass readings
          ld      a, [b]             ;get the enable command
          add     a, #040            ;bump to the next channel
          x       a, [b+]            ; and start the next conversion
          ld      a, [b-]            ;read the previous result
          x       a, [x+]            ; and store it
          ld      a, [b]             ;get the enable command
```

```
        add     r, #040                 ;bump to the next channel
        x       a, [b+]                 ; and start the next conversion
        ld      a, [x+]                 ;bump x to point to b channel
        ld      a, [b]                  ;get the B reading
        x       a, [x+]                 ;and replace the old value
        ld      a, [x+]                 ;bump the pointer
        ld      a, [b]                  ;read the reserve result
        x       a, [x]                  ; and save it
        ld      enad, #0                ;Put A/D in low power mode ld      b, #crgmde
        bitif   chrgb, [b]              ;was bank B charging?
        setbit  txc0, cntrl             ; if so then reenable
        bitif   chrga, [b]              ;How about bank A
        setbit  txc0, t2cntrl
        bitif   chrgrb, [b]             ;Finally test the reserve battery
        jsr     rbcon
        ret t1off:
        ld      b, #portgd
        clrbit  txc0, cntrl             ;turn off timer
        setbit  chrgb, [b]              ; then make sure output is high
        ld      b, #tmr1lo              ;clear out the timer to avoid
        ld      [b+], #0                ; phase shifts
        ld      [b], #0
        ret t2off:
        ld      b, #portld
        clrbit  txc0, t2cntrl           ;turn off timer
        setbit  chrga, [b]              ; then make sure output is high
        ld      b, #tmr2lo              ;clear out the timer to avoid
        ld      [b+], #0                ; phase shifts
        ld      [b], #0
        ld      b, #ophigh              ;make sure the speaker is also off
        clrbit  speakr, [b]
        jmp     puthi rbcend:
        clrbit  chrgrb, crgmde
```

```
rbcoff:
        ld      b, #oplow               ;point to OP low save byte
        clrbit  chrgrb, [b]             ;turn off the Res batt charger
        jmp     putlow rbstrt:
        ld      b, #ophigh
        clrbit  iom, [b]                ;make sure we're set to memory cycle
        jsr     puthi
        ld      a, #L(srescr)           ;get # of times reserve has been charged
        jsrl    m1e00
        inc     a
        x       a, portd
        except  sramu, srescr           ;save the count
        ifeq    portd, #0               ;did we wrap
        jsr     incrcr                  ;then increment upper byte
        setbit  chrgrb, crgmde
        jsrl    clrold
        ld      brvmax, #0              ;clear peak reading
rbcon:
        ld      b, #oplow
        setbit  chrgrb, [b]             ;turn on the reserve batt charger
        jmp     putlow incrcr:
        ld      a, #L(srescr+1)         ;get # of times reserve has been charged
        jsrl    m1e00
        inc     a
        x       a, portd
        except  sramu, srescr+1         ;save the count
        ret incrti:
        ld      a, #L(sresti)           ;reserve operation time
        jsrl    m1e00
        ifgt    a, #min4                ;max time
        ret
        inc     a
        x       a, portd
        except  sramu, sresti           ;save the new time
        ret
```

```
; ROTATE stores the last 8 values in an array pointed to by the B register
;   these values are used to calculate average voltage and current for the
;   battery charge function
;
;       On Entry:
;               A - contains the most recient value read by the A/D
;               B - points to the beginning of the 8 byte array
;       On Exit:
;               A - contains value being discarded
;               B - points to start of the next array rotate:
        x       a, [b+]                 ;Store and increment
        x       a, [b+]
        x       a, [b+]
        x       a, [b+]
        x       a, [b+]
        x       a, [b+]
        x       a, [b+]
        x       a, [b+]
        ret adjcrg:
        bitif   trklec, crgmde          ;are we trickle charging?
        ret                             ; if so just return
        drsz    syscnt                  ;only adjust every 8 seconds
        ret
        ld      syscnt, #8
        jsr     avrage                  ;compute the new averages
        bitif   chrga, crgmde
        jsr     testa
        bitif   chrgb, crgmde
        jsr     testb
;       jsr     dspdc           ;**     ;display duty cycle on smartview
        ret testa:
        ld      a, bacrg ifgt    a, #ihchrg              ;compare with desired charge rate
        jp      shortt                  ; if greater test for short
```

```
        ifgt    a, #ilchrg          ;is charge rate correct?
        ret                         ; yes, then done ld      b, #t2ralo          ;point to timer 2 a reg
        ld      a, [b]              ; and get current setting
        ifeq    a, #maxcrg          ;are we already at maximum
        ret                         ; then stay put
        inc     a                   ;bump the charge rate
        x       a, [b+]
        ld      a, [b+]             ;increment to the b register
        ld      a, [b]              ; and get the current setting
        dec     a                   ;decrement by one
        x       a, [b]              ; and store it back
        ld      hdcnt, #2           ;force new minimum current
        ret shortt:                             ;test for shorted battery
        ld      a, #vterm           ;check voltage
        ifgt    a, batav            ;is voltage nominal
        jmp     acrgof              ;battery is shorted if less than 7.5v
        ld      b, #t2ralo          ;if not then reduce charge
        ld      a, [b]
        ifgt    a, #mincrg          ;are we above the minimum
        jp      short1
        jmp     acrgof              ;if not then turn off short1:
        dec     a
        x       a, [b+]             ;decrease the on time
        ld      a, [b+]
        ld      a, [b]
        inc     a                   ; and increase the off time
        x       a, [b]
        ld      hdcnt, #2           ;wait before next check for -dV
        ret testb:
        ld      a, bbcrg
        ifgt    a, #ihchrg          ;compare with desired charge rate
        jp      shortb              ; if greater test for short
```

```
        ifgt    -a, #ilchrg         ;is charge rate correct?
        ret                         ; yes, then leave it alone ld      b, #t1ralo          ;point to timer 2 a reg
        ld      a, [b]              ; and get current setting
        ifeq    a, #maxcrg          ;are we already at maximum
        ret                         ; then keep constant rate
        inc     a                   ;bump the charge rate
        x       a, [b]              ; and store it back
        ld      b, #t1rblo          ;point to the b register
        ld      a, [b]              ; and get the current setting
        dec     a                   ;decrement by one
        x       a, [b]              ; and store it back
        ld      lcdcnt, #2
        ret shortb:                             ;test for shorted battery
        ld      a, #vterm           ;check voltage
        ifgt    a, batbv            ;is voltage nominal
        jmp     bcrgof              ;battery is shorted if less than 7.5v
        ld      b, #t1ralo          ;if not then reduce charge
        ld      a, [b]
        ifgt    a, #mincrg          ;are we above the minimum
        jp      short2
        jmp     bcrgof              ;if not then turn off short2:
        dec     a
        x       a, [b]              ;decrease the on time
        ld      b, #t1rblo
        ld      a, [b]
        inc     a                   ; and increase the off time
        x       a, [b]
        ld      lcdcnt, #2
        ret tstend:
        drsz    batcnt              ;Maximum charge time
        jp      tst00
        jmp     trickl              ;trickle charge
tst00:
```

```
        bitif   chrga, crgmde
        jsr     testav
        bitif   chrgb, crgmde
        jsr     testbv
        bitif   chrgrb, crgmde
tstr00:
        jsr     testrv
        ld      cnt, #8             ;move last readings to a temp area
        ld      x, #batav
        ld      b, #crgrdg
savlop:
        ld      a, [x+]
        x       a, [b+]
        drsz    cnt
        jp      savlop
        ret tstres:
        jsr     avrage              ;compute average voltage
        jp      tstr00 testav:
        ld      a, crgrdg           ;get old average
        ld      b, #batav
        ifeq    a, [b]              ;are we at a plateu
        jp      vacnst              ; test for timeout
        drsz    hdcnt               ;no -dV after -dPulse width
        jp      tstav0
        ld      hdcnt, #1
        ifgt    a, [b]              ;look for -dV
        jp      acrgof              ; then turn off
tstav0:
        ld      avcnst, #cvtimr     ;voltage changed so reset timer
        ret vacnst:
        ifeq    t2ralo, #maxcrg     ;are we at maximum duty cycle?
        jp      testac              ; then look for +dI
        drsz    avcnst              ;decrement counter
        ret
```

```
acrgof:
        clrbit  chrga, crgmde       ;tell system we are done
        jsr     t2off               ;turn off the timer
        clrbit  chrga, portlc       ; and timer output bit
        ld      lcdcnt, #2          ;force new minimum current for bank B
        bitif   chrgb, crgmde       ;is bank B still charging
        ret                         ; then leave it alone
        jmp     trickl
;       clrbit  charge, crgmde      ; otherwise reset mode
;       ret testac:
        ld      a, becrg            ;check the current reading
        ld      b, #baimin          ; and compare with old average
        ifgt    a, crgrdg+1         ;is I increasing
        jp      tstac1              ; then test limits
tstac0:
        x       a, [b]              ;save new minimum if I not increasing
        ret tstac1:
        drsz    hdcnt               ;don't allow test for 1 min after max
        jp      tstac0              ; force new minimum
        ld      hdcnt, #1           ;once here, always here
        sc                          ;clear borrow for subtraction
        subc    a, [b]              ;find the delta I
        ifgt    a, #deltai          ; cutoff it +dI > 12ma.
        jmp     acrgof
        ret testbv:
        ld      a, crgrdg+2         ;get old average
        ld      b, #batbv
        ifeq    a, [b]              ;are we at a plateu
        jp      vbcnat              ; test for timeout
        drsz    lcdcnt
        jp      tstbv0
        ld      lcdcnt, #1
        ifgt    a, [b]              ;look for -dV
        jp      bcrgof              ; then turn off
tstbv0:
```

```
            ld      -bvcnst, #cvtimr        ;voltage changed so reset timer
            ret vbcnst:
            ifeq    tiralo, #maxcrg
            jp      testbc                  ;look for +dI
            drsz    bvcnst                  ;decrement counter
            ret bcrgof:
            clrbit  chrgb, crgmde           ;tell system we are done
            jsr     tloff                   ;turn off the timer
            clrbit  chrgb, portgc           ; and the output bit
            ld      hdcnt, #2               ;force new minimum current for bank A
            bitif   chrga, crgmde           ;is bank A still charging
            ret                             ; then leave it alone
            jmp     trickl
;           clrbit  charge, crgmde          ; otherwise reset mode
;           ret testbc:
            ld      a, bbcrg                ;check the current reading
            ld      b, #bbimin              ; and compare with old average
            ifgt    a, crgrdg+3             ;is I increasing
            jp      tstbc1
tstbc0:
            x       a, [b]
            ret tstbc1:
            drsz    lcdcnt                  ;delay test until current is stable
            jp      tstbc0
            ld      lcdcnt, #1
            sc
            subc    a, [b]
            ifgt    a,#deltai
            jmp     bcrgof                  ; then turn off charge
            ret testrv:
;           jsr     dsprv                   ;**    Display V on smartview
```

```
         ld      a, batrv             ;get most recent reading
         ld      b, #brvmax           ;point to stored maximum
         x       a, [b]               ; save new maximum?
         ifgt    a, [b]               ;has V decreased
         jp      rbcext               ; then turn off charge
         ret                          ; otherwise just return rbcext:
         ld      b, #ophigh
         clrbit  iom, [b]             ;make sure we're set to memory cycle
         jsr     puthi
         ld      portd, #0
         except  srmmw, sresti        ;reset reserve usage time
         jmp     rbcend dspcg:
         ld      a, portcd            ;port c data
         jsr     makhex
         jsr     smrtlo               ;output to lower 2 bytes
         ld      a, portgp            ; and port g data
         jsr     makhex
         jmp     smrthi               ;upper 2 bytes dspsp:
         ld      a, sp                ;stack pointer
         jsr     makhex
         jsr     smrtlo               ;output to lower 2 bytes
         ld      b, #avwork
         ld      [b+], #070           ;'p'
         ld      [b], #073            ;'s'
         jmp     smrthi               ;upper 2 bytes dsprv:
         ld      a, betrv
         jsr     makhex
         jsr     smrtlo               ;output to lower 2 bytes
         ld      a, brvmax
         jsr     makhex
         jmp     smrthi               ;upper 2 bytes dspdc:
```

```
        jsr     t2off                   ;make sure charger is off completly
        clrbit  chrga, portlc           ; so we can use this timer
        jsr     t1off                   ;this timer is duration
        clrbit  chrgb, portgc
        ld      b, #t2ralo              ;point to timer reload registers
        ld      [b+], #L(beepct-1)
        ld      [b+], #H(beepct-1)
        ld      [b+], #L(beepct-1)
        ld      [b], #H(beepct-1)
        ld      b, #t1ralo
        ld      [b+], #L(btime)
        ld      [b], #H(btime)
        ld      t2cntrl, #095           ;start the timer
        ld      cntrl, #090
        rbit    1, icntrl               ;clear the pending flag
        sbit    0, icntrl               ; and enable the interrupt
        ret ckrbat:
        ld      a, #084                 ;read rbat voltage
        x       a, enad                 ;start the conversion
        ld      a, #L(sresti)           ;get rbat operation time
        jsrl    m1e00
        ifgt    a, #min4/4              ;charge if used for more than 1 minute
        jp      ckac                    ;charge reserve battery if ac available
ckr00:
        ld      a, adrslt               ;get the reserve voltage
        ld      enad, #0                ;Put A/D in low power mode
        ifgt    a, #vrmin               ;test for minimum allowed voltage
        ret
crgrbt:
        jmp     rbatrt ckac:
        ld      enad, #0                ;Put A/D in low power mode
        bitif   acav, portcp            ;Next test for AC power
        jp      ck2min                  ;2 minutes operation before charg from bat
        jp      crgrbt
ck2min:
        ifgt    a, #min4/2              ;if more then 2 minutes
        jp      crgrbt                  ; charge even if no AC
```

```
        jp      ckr00                   ; otherwise check voltage

; CKSRAM will look for a A5h at address 1E02 to indicate that the  SRAM
; data has been initialized.  If it does not find the A5h it will clear
; the area between 1E02 and 1EFF, and then store an A5 at 1E02.

cksram:
        ld      a, #L(sinitf)           ;get lower byte of address
        jsrl    m1e00
        ifeq    a, #0A5
        ret
        ld      b, #ophigh
        clrbit  iom, [b]                ;make sure we're set to memory cycle
        jsr     puthi
        ld      portd, #0
        except  sramw, sresti
        except  sramw, srescr
        except  sramw, srescr+1
        except  sramw, sresdi
        except  sramw, sresdi+1
        except  sramw, dmy008
        except  sramw, dmy009
        except  sramw, dmy00A
        except  sramw, dmy00B
        except  sramw, dmy00C
        except  sramw, dmy00D
        except  sramw, dmy00E
        except  sramw, dmy00F
        except  sramw, dmy010
        except  sramw, dmy011
        except  sramw, dmy012
        except  sramw, dmy013
        except  sramw, dmy014
        except  sramw, dmy015
        except  sramw, dmy016
        except  sramw, dmy017
        except  sramw, dmy018
        except  sramw, dmy019
        except  sramw, dmy01A
        except  sramw, dmy01B
```

```
except  sramu, dmy01C
except  sramu, dmy01D
except  sramu, dmy01E
except  sramu, dmy01F
except  sramu, dmy020
except  sramu, dmy021
except  sramu, dmy022
except  sramu, dmy023
except  sramu, dmy024
except  sramu, dmy025
except  sramu, dmy026
except  sramu, dmy027
except  sramu, dmy028
ld      portd, #0FF         ;force initial charge of rbat
except  sramu, sresti
ld      portd, #0A5         ;area now initialized
except  sramu, sinitf
ret
```

```
;
; CHK1ST does a checksum of the first 100h locations in the program.
; This can be extended to check all of program memory by adding a
;       LAID
;       RET
; to every 100h block of memory, and then looping through each call
; 100h times as below.
;
chk1st:
        ld      cnt, #0         ;loop counter (must be a register)
        ld      ckadr, #0       ;address in the block
        ld      ckdata, #0AA    ;seed for checksum
ckloop:
        ld      a, ckadr        ;get the current addresss to check
        inc     a               ;increment for next time
        x       a, ckadr        ;save the incremented value
        jsr     ckam00          ;get the contents from the address in block 0
        add     a, ckdata       ;and add in the running total
        x       a, ckdata       ;store it back
        drsz    cnt             ;do this 256 times
```

```
        jp      ckloop
        ld      a, ckdata       ;get the checksum
        x       a, portd        ;to report to host
        except  sramw, 01f81    ;return checksum as 1st parameter
        ret ;This is a routine to test I/O writes to the host processor bus ;  The X register is used to point to the Data to be output
;  The B register points to Port D during the data transfer iow080:
; first set IO_M to IO in OPH
        ld      b, #ophigh      ;point to the op register data storage
        setbit  iom, [b]        ; D port data = 10000000 for IO
        jsr     puthi ld      x, #temp        ;pointer for data to be output ; next, set up DRQ5 in OPL
        ld      a, oplow        ;get the op register data
        x       a, portd        ; so we can retreive this later
        ld      a, portd        ; emulate a store instruction
        or      a, #drq5        ;set the drq5 bit in the register save data
        x       a, portd        ; D port data = 00000001 for DRQ5
        ld      b, #portcd
        clrbit  milsad, [b]     ; C0 = 0
        setbit  milstb, [b]     ; C1 = 1 (this starts the DREQ cycle)

; now look for DACK ckdack

; next, pull master high in OPL
        ld      b, #portd       ; point to the D port
        setbit  master, [b]     ; D port data = 00000011 for master*
        clrbit  milstb, portcd  ; close the OP Low register ; write desired data to D port
        x       a, [x]          ;recover the data to output
        x       a, [b]          ; and store it in port D
```

```
;   execute the IO write exception cycle to port 80h
        except  iow, 080 x       a, [b]              ;recover data
        x       a, [x]              ;and return to temp while recovering A ;   clear DRQ and master*
        x       a, [b]              ; A contains the original OP Low value
        ld      b, #portcd          ; point back to port C
        setbit  milstb, [b]         ; turn off master mode
        clrbit  milstb, [b]

;   now set IO_M* to M in OPH
        ld      b, #ophigh          ;point to the op register data storage
        clrbit  iom, [b]            ;point to memory
        jmp     puthi               ; and return ;
;***********************************************
;       Instruction set checkout
;***********************************************
instst: ld      erc,#0   ;initialize error reference counter
;
; Section 1 - load memory locations with addresses.
;       This section utilizes all variations of the
;       load and exchange instructions.
;       Memory locations 010-01f are loaded with
;       their respective addresses.
;
        ld      010,#010
        ld      011,#011
        ld      b,#012
        ld      a,b
        x       a,[b]
        ld      a,[b+]
        inca
        x       a,[b+]
        ld      [b+],#014
        ld      [b],#015
        ld      A,#00A
        add     a,b
```

```
        ld      b,#01f
        x       a,[b]
        ld      a,[b-]
        deca
        x       a,[b]
        ld      a,[b]
        deca
        x       a,b
        ld      a,b
        x       a,[b-]
        ld      [b-],#01c
        ld      [b-],#01b
        ld      x,#01a
        ld      a,x
        x       a,[x]
        ld      a,[x-]
        deca
        x       a,[x-]
        ld      a,#002
        x       a,x
        sc
        subc    a,x
        rc
        x       a,x
        ld      a,x
        x       a,[x]
        ld      a,[x+]
        inca
        x       a,[x+]
        ld      a,#018
        x       a,[x+]
        ld      a,[x]
        ifeq    a,#019   ;result=019?
        sc
        drsz    erc
        ifnc
;       jmp     er1
;
er1:    jsr     atoc
e1:     jp      e1
er4:    jsr     atoc
```

```
e4:     jp      e4
er5:    jsr     atoc
e5:     jp      e5
er8:    jsr     atoc
e8:     jp      e8
er9:    jsr     atoc
e9:     jp      e9
er10:   jsr     atoc
e10:    jp      e10
er11:   jsr     atoc
e11:    jp      e11
er12:   jsr     atoc
e12:    jp      e12
er13:   jsr     atoc
e13:    jp      e13
er14:   jsr     atoc
e14:    jp      e14
        nop
er15:   jsr     atoc
e15:    jp      e15
er16:   jsr     atoc
e16:    jp      e16
er17:   jsr     atoc
e17:    jp      e17
er18:   jsr     atoc
e18:    jp      e18
er19:   jsr     atoc
e19:    jp      e19
er20:   jsr     atoc
e20:    jp      e20
er21:   jsr     atoc
e21:    jp      e21
er22:   jsr     atoc
e22:    jp      e22
er23:   jsr     atoc
e23:    jp      e23
er24:   jsr     atoc
e24:    jp      e24
er25:   jsr     atoc
e25:    jp      e25
er26:   jsr     atoc
```

```
e26:    jp      e26
er27:   jsr     atoc
e27:    jp      e27
er28:   jsr     atoc
e28:    jp      e28
er29:   jsr     atoc
e29:    jp      e29
er30:   jsr     atoc
e30:    jp      e30
er31:   jsr     atoc
e31:    jp      e31
er32:   jsr     atoc
e32:    jp      e32
;
; Error subroutine - Error number output to port 80h
;                    Error data stored in SRAM at 1FC0h
;
Atoc:
        x       a, portd        ;setup error data
        except  sramm, 01FC0    ; and store in SRAM
        ld      a,erc           ;output error #
        x       a,temp          ; to port 80h
        jmp     iow080
;
;
; Section 13 - Multiply (16 x 16)
;
msetup: drsz    erc
        drsz    erc
        drsz    erc
        drsz    erc
        ld      a,#0cb
        ld      b,#0
        x       a,[b]
        ld      a,[b]
        ld      b,#3
        x       a,[b]
        ld      a,[b-]
        swap    a
        x       a,[b]
        ld      a,[b-]
```

```
           x     a,[b]
           jsr   mult
           drsz  erc
           ld    a,[b-]
           ifeq  a,#096
           jp    byp26
er49:      jsr   atoc
e49:       jp    e49
byp26:     drsz  erc
           ld    a,[b-]
           ifeq  a,#03f
           jp    byp27
er50:      jsr   atoc
e50:       jp    e50
byp27:     drsz  erc
           ld    a,[b-]
           ifeq  a,#09e
           jp    byp28
er51:      jsr   atoc
e51:       jp    e51
byp28:     drsz  erc
           ld    a,[b]
           ifeq  a,#014
           jp    nuinst
er52:      jsr   atoc
e52:       jp    e52
;
; Section 14 - Check new instructions
;
er53:      jsr   atoc
e53:       jp    e53
er54:      jsr   atoc
e54:       jp    e54
er55:      jsr   atoc
e55:       jp    e55
er56:      jsr   atoc
e56:       jp    e56 nuinst:    ld    b,#0b
           ld    a,#0a
```

```
;
; COP 800 (16 x 16) multiply routine
;       Multiplicand in (1,0) multiplier in (3,2)
;       product in (5,4,3,2)
;
        cntr = 0f0
mult:   ld      cntr,#17
        ld      b,#4
        ld      [b+1],#0
        ld      [b],#0
        ld      x,#0
        rc
mloop:  ld      a,[b]
        rrc     a
        x       a,[b-]
        ld      a,[b]
        rrc     a
        x       a,[b-]
        ld      a,[b]
        rrc     a
        x       a,[b-]
        ld      a,[b]
        rrc     a
        x       a,[b]
        ld      b,#5
        ifnc
        jp      test
        rc
        ld      b,#4
        ld      a,[x+]
        adc     a,[b]
        x       a,[b+]
        ld      a,[x-]
        adc     a,[b]
        x       a,[b]
test:   drsz    cntr
        jp      mloop
        ret tog:
        ld      b, #oplow
```

```
        setbit  lowbat, [b]         ;turn on the low batt LED
        jsr     putlow
        ld      b, #portcd
        clrbit  crgled, [b]         ; also the charge LED
        clrbit  pwrled, [b]         ; and the power LED
        ret tog1:
        ld      b, #oplow
        clrbit  lowbat, [b]         ;turn off the low batt LED
        jsr     putlow
        ld      b, #portcd
        clrbit  crgled, [b]         ; turn the charge LED on
        clrbit  pwrled, [b]         ; and the power LED on
        ret ;
; Enter halt mode with A/D conversion started
;
atod4:  ld      enad,#0c
        nop
        nop
        nop
;       sbit    7,portgd
;
; Halt test to measure halt current
;
halt:   nop
;       sbit    7,portgd
        nop
        ret .=0C00                      ; SRAM address for ports 02 - FFh ; This routine will allow the COP to read I/O ports between it's ending
; address and 0FFh. The routine is called with A = L(port address)

ior000:
        laid                        ;read data out of SRAM
        ret
```

```
        .=0D00                          ; SRAM address for ports 102 - 1FFh

; This routine will allow the COP to read I/O ports between it's ending
; address and 01FFh.  The routine is called with A = L(port address)

ior100:
        laid                    ;read data out of SRAM
        ret

.=0E00                          ; SRAM address for ports 202 - 2FFh

; This routine will allow the COP to read I/O ports between it's ending
; address and 02FFh.  The routine is called with A = L(port address)

ior200:
        laid                    ;read data out of SRAM
        ret

.=0F00                          ; SRAM address for ports 302 - 3FFh

; This routine will allow the COP to read I/O ports between it's ending
; address and 03FFh.  The routine is called with A = L(port address)

ior300:
        laid                    ;read data out of SRAM
        ret

.=01000

;
; External interrupt G0 interrupt vector
;
extirq:
        jsr     getcmd          ;read the command from SRAM
        jsr     dispch          ;decode and execute
        ld      b, #ophigh
        clrbit  iom, [b]        ;make sure we're set to memory for CDONE
        jsrl    puthi
        rbit    3,psw
        except  scdone, 0       ; set CDONE for the host
        jmpl    restor
```

```
dispch:
        add     a, #L(tblbeg)
        ifgt    a, #L(tblend)
        jp      cmderr          ;invalid command
        jid cmderr:
        ld      portd, #0ff     ;indicate command error
        except  sramw, 01f80    ;replace original command
        ret tblbeg:
        .addr   cksum           ; 0 - Checksum SRAM
        .addr   slftst          ; 1 - Initiate self test
        .addr   togbat          ; 2 - Switch batteries
        .addr   sbatA           ; 3 - Select battery A
        .addr   sbatB           ; 4 - Select battery B
        .addr   sbatR           ; 5 - Select reserve battery
        .addr   dsbatR          ; 6 - Deselect reserve battery
        .addr   dspon           ; 7 - Turn on backlight and display
        .addr   dspoff          ; 8 - Turn off backlight and display
        .addr   batst           ; 9 - Return battery status
        .addr   sleep           ; A - Enter sleep mode
        .addr   endslp          ; B - Exit sleep mode
        .addr   slwclk          ; C - Enter slow clock mode
        .addr   fstclk          ; D - Enter fast clock mode
        .addr   stndby          ; E - Enter standby mode
        .addr   purdwn          ; F - Turn off System Power Module
        .addr   acpchk          ;10 - Current AC power & switches check
        .addr   strtpm          ;11 - Start power management
        .addr   drvoff          ;12 - Put hard disk to sleep
        .addr   endpm           ;13 - Stop power management functions
        .addr   c20on           ;14 - Turn on the WD 90C20
        .addr   c20off          ;15 - Turn off the WD 90C20
        .addr   cmderr          ;16 - Dummy entry to reserve space
        .addr   stchrg          ;17 - Start a charge cycle for test
        .addr   outlow          ;18 - Set state of OP Low bits
        .addr   outhi           ;19 - Set state of OP High bits
        .addr   spwmt1          ;1A - Set high/low timer 1
        .addr   spwmt2          ;1B - Set high/low timer 2
tblend:
```

```
        .addr   crgres              ;1C - Charge reserve 0 = off/1 = on

; The following is the actual table of jumps to the various routines.
; This is a rather convoluted way of doing things, but this is the
; simplest indirect jump/dispatch method supported by the COP.
; This entire table starting from the JID instruction above must
; fit in the same 100H page of memory.

cksum:
        jmp     chksum siftst:
        ret
;       jmp     cmderr              ;invalid command sbatA:
        setbit  bankb, oplow        ;make system think it's on bank B
togbat:
        jsrl    cngalt              ;force the change always
        jmp     cmderr
        ld      batcnt, #min4       ; and reset the timeout
        ret sbatB:
        clrbit  bankb, oplow        ;make system think it's on bank A
        jp      togbat sbatR:
        clrbit  rbin, portcd        ;turn on reserve battery
        ret dsbatR:
        setbit  rbin, portcd        ;turn off reserve battery
        ret dspon:
        jmpl    dsplon              ;turn on display and backlight dspoff:
        jmpl    dsplof              ;turn off the display & backlight
```

```
betst:
        jsrl    readad          ;read the A/D channels
;       jsrl    avrage          ;compute the average
        jmpl    writed          ;and return the instantaneous results sleep:
        setbit  slpmde, mode
        ld      a, #0C4         ;250KHz for 286
        bitif   s386, sysbyt    ;is it really a 386
        xor     a, #050         ; if so switch to 2 MHz
        x       a, temp         ;set sleep mode register
        jsr     htctlw          ;write HT21 control and return
        clrbit  kbdint, wkpnd   ;Clear keyboard to start
        setbit  kbdint, wken    ;enable wakeup interrupt
        ret endslp:
        clrbit  slpmde, mode
        ld      temp, #014      ;turn off sleep mode
        jmp     htctlw          ;write HT21 control and return slwclk:
        jmpl    lspeed          ;set the processor speed to low fstclk:
        jmpl    hspeed          ;set the processor speed to high pwrdwn:
        jmpl    spmoff          ;turn off System Power Module acpchk:
        jmp     chkac strtpm:
        ld      cnt, #4         ;4 parameters currently
        jsr     gsparm          ; get the parameters
        jsr     xsump           ;checksum the parameters
        x       a, [x]          ; and store the checksum
        jmpl    stmout          ; then set the timeout values
```

```
endpm:
        jmp     cmderr          ;invalid command
chksum:
        jmpl    chk1st          ;checksum 1st block of program stndby:
        jsr     chkact          ;see if system currently busy
        jsr     drvoff          ;turn off the drive
        jsrl    dspof0          ;turn off the display
;       bitif   crton, flashb   ;are we using the crt
;       jp      stnd00
        jsr     c20off          ;turn off the 90C20
stnd00:
        jsr     sleep           ;slow the clock
        jsr     cpuhld          ;lowest power mode
        ld      erc, #1         ;setup to flash every two seconds
        ret stchrg:
        jmp     stcrg1 crgres:
        jsr     get1p
        ifeq    debug, #0
        jmpl    rbcend
        jmpl    rbstrt outlow:
        jsr     get1p           ; get 1 parameter from data area
        ld      a, debug        ; and store it in debug
        ld      b, #oplow
        x       a, [b]
        jmpl    putlow          ; then output to OP Low and return outhi:
        jsr     get1p
        ld      a, debug
        ld      b, #ophigh
        x       a, [b]
        jmpl    puthi           ; same as above to OP High
```

```
spwmt1:
        jmp     spwm1x spwmt2:
        jsr     get4p                   ;transfer indirect to allow alt entry
spwm2a:
        clrbit  txc0, t2cntrl           ;Make sure we're off to start
        setbit  chrga, portld           ; including the FET control line
        setbit  chrga, portlc           ; make L4 an output
        ld      x, #debug
        ld      b, #t2ralo
        ld      cnt, #4                 ;transfer 4 parameters
t2loop:
        ld      a, [x+]
        x       a, [b+]
        drsz    cnt
        jp      t2loop ld      t2cntrl, #080           ;enable pwm mode
        setbit  chrga, crgmde
        ret drvoff:
        jmp     drvof1 chkact:
        ret c20off:
        ld      b, #ophigh              ;point to op high byte
        clrbit  pd9020, [b]             ;turn off the 90C20
        jmpl    puthi                   ; after the backlight and return c20on:
        ld      b, #ophigh              ;point to op high byte
        setbit  pd9020, [b]             ;turn on 90C20
        jmpl    puthi                   ; before the backlight spwm1x:
        jsr     get4p
spwm1a:
```

```
            clrbit   ~txc0, cntrl           ;turn off the timer
            setbit   chrgb, portgd          ; and force the charger off
            setbit   chrgb, portgc          ; G3 is an output
            ld       x, #debug
            ld       b, #tiralo
            ld       a, [x+]                ;transfer the first 2 parameters
            x        a, [b+]
            ld       a, [x+]
            x        a, [b]
            ld       b, #tirblo             ;then do the next two
            ld       a, [x+]
            x        a, [b+]
            ld       a, [x]
            x        a, [b]
            ld       cntrl, #080            ; turn on timer
            setbit   chrgb, crgmde
            ret stcrg1:
            bitif    acav, portcp           ;don't try to charge from batteries
            ret
            jsrl     clrbsy                 ;clear battery detect
            bitif    bdt, portlp            ;is there a battery present
            ret                             ; nop if no battery present
            ld       batcnt, #mxctim        ;max charge time = 3 hours
            clrbit   crgled, portcd
            ld       syscnt, #0
            ld       lcdcnt, #1
            ld       hdcnt, #1
            jsr      clrold                 ;clear the peak readings
            clrbit   trklec, crgmde         ;not trickle charge
            setbit   charge, crgmde         ;indicate we're really charging sttrkl:
            ld       b, #debug
            ld       [b+], #mincrg          ;set small duty cycle to start
            ld       [b+], #00
            ld       [b+], #(maxcrg-mincrg)
            ld       [b], #00
            jsr      spwm2a                 ;start Bat A charging
            ld       b, #debug
```

```
        ld      [b+], #mincrg           ;set small duty cycle to start
        ld      [b+], #00
        ld      [b+], #(maxcrg-mincrg)
        ld      [b], #00
        jmp     spwm1a                  ;start Bat B charging chkac:
        ld      b, #ophigh
        clrbit  iom, [b]
        jsrl    puthi
        jsrl    clrbsy                  ;reset the latch
        ld      a, mode                 ;get the contents of the mode byte
        and     a, #lobat2+lobat3
        swap    a                       ;swap nibbles
        bitif   lobat1, mode
        or      a, #020
        bitif   acav, portcp            ;test for ac available
        jp      chkac1                  ; if AC not avail
        or      a, #acav
chkac1:
        bitif   swx, portgp             ;also check standby switch
        jp      chkac2
        or      a, #swx                 ;if switch is down
chkac2:
        bitif   bdt, portlp
        jp      chkac3
        or      a, #bdt
chkac3:
        x       a, portd                ;put the flags in the D port
        except  sramw, 01F81            ;and write them to SRAM
        ret ; This routine will become master and write the data in TEMP to HT21 ctl reg 5
;
htctlw:

; first set IO_M~ to IO in OPH
        ld      b, #ophigh              ;point to the op register data storage
        setbit  iom, [b]                ; O port data = 10000000 for IO
        jsrl    puthi
```

```
        ld      a, t1ralo               ;on time for bank b
        jsr     makhex
        jsr     smrtlo                  ;output to lower 2 bytes
        ld      a, t2ralo               ;on time for bank a
        jsr     makhex
        jmp     smrthi                  ;upper 2 bytes makhex:
        ld      b, #avwork              ;point to temp area
        push    a
        jsr     hexnbl                  ;convert to hex
        pop     a                       ;recover original value
        swap    a                       ; and reverse nibbles hexnbl:
        and     a, #0F                  ;mask off upper nibble
        add     a, #030
        ifgt    a, #039
        add     a, #07
        x       a, [b+]
        ret ;This is a debug routine to write values to smart view on the host processor bus ;   The X register is used to point to the Data to be output
;   The B register points to Port D during the data transfer smrtlo:
;   first set IO_N" to IO in OPH
        ld      b, #ophigh              ;point to the op register data storage
        setbit  iom, [b]                ; 0 port data = 10000000 for IO
        jsr     puthi ld      x, #avwork              ;pointer for data to be output ;   next, set up DRQ5 in OPL
        ld      a, oplow                ;get the op register data
        x       a, portd                ; so we can retreive this later
        ld      a, portd                ; emulate a store instruction
        or      a, #drq5                ;set the drq5 bit in the register save data
```

```
        x       -w, portd            ; O port data = 00000001 for DRQ5
        ld      b, #portcd
        clrbit  milsad, [b]          ; C0 = 0
        setbit  milstb, [b]          ; C1 = 1 (this starts the DREQ cycle)

; now look for DACK ckdack

; next, pull master high in OPL
        ld      b, #portd            ; point to the O port
        setbit  master, [b]          ; O port data = 00000011 for master*
        clrbit  milstb, portcd       ; close the OP Low register ; write desired data to O port
        x       a, [x+]              ;recover the data to output
        x       a, [b]               ; and store it in port O ; execute the io write exception cycle to port 94h
        except  iow, 094 x       a, [x]               ;get the next byte to output
        x       a, [b]               ; and put it in port O ; execute the io write exception cycle to port 95h
        except  iow, 095

; clear DRQ and master*
        ld      a, oplow
        x       a, [b]               ; A contains the original OP Low value
        ld      b, #portcd           ; point back to port C
        setbit  milstb, [b]          ; turn off master mode
        clrbit  milstb, [b]

; now set IO_M~ to M in OPH
        ld      b, #ophigh           ;point to the op register data storage
        clrbit  iom, [b]             ;point to memory
        jmp     puthi                ; and return ;This is a debug routine to write values to smart view on the host processor bus
```

```
; The X register is used to point to the Data to be output
; The B register points to Port D during the data transfer smrthi:
; first set IO_M to IO in OPH
        ld      b, #ophigh              ;point to the op register data storage
        setbit  iom, [b]                ; D port data = 10000000 for IO
        jsr     puthi ld      x, #avwork              ;pointer for data to be output ; next, set up DRQ5 in OPL
        ld      a, oplow                ;get the op register data
        x       a, portd                ; so we can retreive this later
        ld      a, portd                ; emulate a store instruction
        or      a, #drq5                ;set the drq5 bit in the register save data
        x       a, portd                ; D port data = 00000001 for DRQ5
        ld      b, #portcd
        clrbit  milsad, [b]             ; C0 = 0
        setbit  milstb, [b]             ; C1 = 1 (this starts the DREQ cycle)

; now look for DACK ckdack

; next, pull master high in OPL
        ld      b, #portd               ; point to the D port
        setbit  master, [b]             ; D port data = 00000011 for master*
        clrbit  milstb, portcd          ; close the OP Low register ; write desired data to D port
        x       a, [x+]                 ;recover the data to output
        x       a, [b]                  ; and store it in port D ; execute the io write exception cycle to port 96h
        except  iow, 096 x       a, [x]                  ;get the next byte to output
        x       a, [b]                  ; and put it in port D ; execute the io write exception cycle to port 97h
```

```
        except  low, 097

; clear DRQ and master*
        ld      a, oplow
        x       a, [b]              ; A contains the original OP Low value
        ld      b, #portcd          ; point back to port C
        setbit  milstb, [b]         ; turn off master mode
        clrbit  milstb, [b]

; now set IO_M^- to M in OPH
        ld      b, #ophigh          ;point to the op register data storage
        clrbit  iom, [b]            ;point to memory
        jmp     puthi               ; and return ; TRICKL puts the system in trickle charge mode trickl:
;       ld      batcnt, #1          ;so we'll come back next time
trklon:
        clrbit  charge, crgmde      ; reset mode
        setbit  crgled, portcd      ;turn off the charge led
        bitif   acav, portcp        ;don't try to charge from batteries
        ret
        jsr     clrbsy              ;clear battery detect
        bitif   bdt, portlp        ;is there a battery present
        ret                         ; nop if no battery present
        setbit  trklec, crgmde
        jmpl    sttrkl              ;minimum charge rate trklof:
        clrbit  charge, crgmde      ;make sure no charge active
        clrbit  trklec, crgmde      ;no longer in trickle charge mode
        setbit  crgled, portcd      ;turn off the charge led
        jsr     t1off               ; so turn off the charge timers
        jsr     t2off
        jmp     dlypmd      ;**     ;initialize min and max ; SHRTON will drop master for a short period of time to allow the cpu to
; service the timer interrupt in order to maintain the DOS/UNIX clock
```

```
shrton:
        bitif    hldreq, mode           ;are we in hold currently
        jp       shrt00                 ; if so then turn on for a short time
        ret                             ; otherwise just return
shrt00:

;   set IO_M~ to IO in OPH ld       b, #ophigh             ;point to the op register data storage
        setbit   iom, [b]               ; 0 port data = 10000000 for IO
        setbit   pd9020, [b]            ;turn on 90C20
        jsr      puthi clrbit   cpuint, wkpnd          ;clear the interrupt bit
        ld       b, #oplow
        clrbit   drq5, [b]              ;drop DRQ5
        clrbit   master, [b]            ; and master
        jsr      putlow                 ;for a short time
        ld       b, #portlp             ;point to the L port
onloop:
        bitif    cpuint, [b]            ;wait for the interrupt to be serviced
        jp       onloop                 ;  by the host cpu jsr      delay                  ; give cpu time to complete interrupt
        ld       b, #oplow
        setbit   drq5, [b]              ;now lets reassert drq, etc
        ld       a, [b]                 ;get the op register data
        x        a, portd               ;and write to port d
        setbit   master, [b]            ; set flag while we still point there
        ld       b, #portcd
        clrbit   milsad, [b]            ; C0 = 0
        setbit   milstb, [b]            ; C1 = 1 (this starts the DREQ cycle)

;   now look for DACK ckdack

;   next, pull master high in OPL
        ld       b, #portd              ; point to the 0 port
        setbit   master, [b]            ; 0 port data = 00000011 for master*
        clrbit   milstb, portcd         ; close the OP Low register
```

```
; now set IO_M to M in OPH
        ld      b, #ophigh              ;point to the op register data storage
        clrbit  iom, [b]                ;point to memory
        bitif   crton, flashb           ;are we using the crt
        jp      shrt01                  ; then don't turn video off
        clrbit  pd9020, [b]             ;turn off 90C20
shrt01:
        jmp     puthi                   ; and return ; SPMOFF outputs a active high pulse to kill the system power module.
; This routine does not return, it just loops waiting for power to go away spmoff:
;       jp      copoff
;       jsr     dspsp                   ;display stack
;       jp      .               ;** debug only
        ld      b, #ophigh
        clrbit  dcoff, [b]              ;Start low
        jsr     puthi
        ld      b, #ophigh
        setbit  dcoff, [b]              ;bring it high
        jsr     puthi                   ; and leave it there ; COPOFF turns off the COP by forcing a watchdog error copoff:
        ld      b, #ophigh
        ld      [b], #fatoff            ;high speed, video off
        jsr     puthi                   ;This is to get around powerup
                                        ; problem with MILES
        ld      b, #oplow
        ld      [b], #0
        jsr     putlow
        setbit  rbin, portcd            ;turn off the reserve battery
        ld      wdcnt, #0               ;invalid data for watchdog to force reset
        jp      .                       ;wait for power to go away
;tstflh:                                ;** DEBUG **
;       ld      b, #oplow
;       jsr     fllbat
;       jsr     dely50
```

```
;       jp      -tstflh
;fllbat:
;       bitif   lowbat, [b]
;       jmp     lbtoff
;       jmp     lblon ;
; Routine to switch batteries every 4 minutes and
;   then reset idle count down timer. Skips next instruction
;   after returning if operation is successful
;
cngbat:
        ld      batcnt, #min4
        jsr     tstbat          ;make sure other bank is good
        ret
cngalt:
        setbit  cngben, crgmde  ;enable change on next timer tick
        clrbit  rbin, portcd    ;turn on reserve battery
        clrbit  bdt, wken       ;disable battery detect interrupt
        ld      tdelay, #200    ;1 sec delay before battery test
        retsk                   ;pretend we're done docngb:
        setbit  cngoff, crgmde  ;enable reserve off on next timer tick
        clrbit  cngben, crgmde  ; and don't switch again for a while
        ld      b,#oplow        ;point to the op register data storage
        ld      a,#benkb        ;set bit to invert
        xor     a,[b]           ;invert it
        x       a,[b]           ;and store the new value
        jmp     putlow          ;set the byte in the MILES OP register reseta:
        ld      a, batav
        x       a, bavmax       ;reset maximum on A
        ret resoff:
        clrbit  cngoff, crgmde  ;so we won't come here again
        jsr     clrbdt          ;reset the battery detect latch
        bitif   bdt, portlp     ;then check to see if battery really present
        jp      nobat           ;if battery just removed
```

```
        setbit  *rbin, portcd      ;if good then turn off the reserve
        setbit  bdt, wken          ; and reenable the bdt interrupt
        bitif   bankb, oplow       ;check for current bank
        jp      resets
        ld      a, batbv
        x       a, bbvmax          ;reset maximum on B
        ret nobat:
        setbit  bdt, wkpnd         ;make sure interrupt is active
        setbit  bdt, wken          ; and reenable the bdt interrupt
        ret                        ; then continue tstbat:
        ld      a, #04             ;set single & divide by 6
        bitif   bankb, oplow       ;if on bank B
        or      a, #040            ; setup to read battery B's voltage
        x       a, enad            ;and enable A/D converter
        ld      a, enad            ; retreive the enable command
        xor     a, #040            ; setup to read the other channel
        nop                        ;Time delay to complete conversion
        nop
        nop
        x       a, enad            ;start the next cycle
        ld      a, adrslt          ; get the previous value
        ld      b, #adrslt         ;delay and setup for compare
        nop
        nop
        nop
        ld      enad, #0           ;Put A/D in low power mode
        ifgt    a, [b]             ;no load V must be greater then loaded V
        ret                        ; or we won't switch
        ifeq    a, [b]             ;equal isn't good enough
        ret
        retsk delay:
        ld      cnt, #45           ;approx 900 usec delay
dellop:
        jsr     delay1             ; 20usec/loop at 8MHz
```

```
        drsz    -cnt
        jp      dellop
        ret delay1:
        ret dely50:
        ld      cnt, #20        ;**10   ;minimum of 51msec delay
        rbit    5, icntrl               ;clear the T0 overflow bit
dely5a:
        ifbit   5, icntrl               ;require 1 full idle period to start
        jp      dely51                  ; before servicing watchdog
        jp      dely5a                  ;loop
dely51:
        rbit    5, icntrl               ;clear the T0 overflow bit
dely52:
        ifbit   5, icntrl               ;wait for it to be set again
        jp      dely53
        jp      dely52                  ;loop
dely53:
        ld      wdcnt, #009     ;service watch dog 2-65K window, clock monitor on
        drsz    cnt                     ;10 timer overflows
        jp      dely51                  ;wait another 5.12msec
        ret ;  TSTSTB tests the standby button to see if the user is requesting
;  standby mode tststb:
        ld      b, #flashb
        bitif   swx, portgp             ;is the standby switch depressed?
        jp      tsts01                  ; low true so, if not pressed, check for release
        bitif   stdeb1, [b]             ;check debounce bit
        jp      tsts00
        setbit  stdeb1, [b]
        ret
tsts00:
        setbit  stdeb2, [b]
        ret
```

```
tsts01:
        bitif   stdeb2, [b]
        jp      tsts02
        clrbit  stdeb1, [b]
        ret
tsts02:
        bitif   hldreq, mode        ;are we already in standby?
        jp      exstby              ; then exit
        bitif   poa, [b]            ;was the case closed?
        jp      exstby              ; then don't enter standby when opened
        clrbit  stdeb1, [b]
        clrbit  stdeb2, [b]
        ld      alrmct, #0          ;switch is up, so clear count
        clrbit  poa, [b]
        bitif   stbyen, sysbyt      ;is the standby switch enabled?
        jmpl    stndby
        ret                         ;otherwise do nothing exstby:
        clrbit  stdeb2, [b]
        clrbit  stdeb1, [b]
        ld      alrmct, #0          ;switch is up, so clear count
        clrbit  poa, [b]
        clrbit  poabep, [b]
        jsr     hldoff              ;bring cpu out of hold
        ret ; FLASHP uses the counter ERC to flash the power LED .5 seconds
; on every 2 seconds flashp:
        drsz    erc                 ;test the counter
        ret                         ;until underflow
        bitif   pwrled, portcp     ;test if light is off/on
        jp      pledon              ;if off then turn on
        bitif   poabep, flashb      ;should we beep
        jsr     stbeep
        setbit  pwrled, portcd     ;turn led off
        ld      erc, #0             ;off for approx 1.3 seconds
        bitif   lobat2, mode
        ret                         ;don't affect low bat led
```

```
        bitif   bdt, mode
        jp      lblon                   ;turn on lowbat led
        ret
pledon:
        bitif   posbep, flashb          ;should we beep
        jsr     stbeep
        clrbit  purled, portcd          ;turn the led on
        ld      erc, #(seccnt/2)+1      ; for .5 seconds
        bitif   lobat2, mode
        ret                             ;don't affect low bat led
        bitif   bdt, mode
        jp      lbloff                  ;turn off lowbat led
        ret lblon:
        bitif   lobat2, mode
        jsr     stbeep                  ;beep if low bat 2 mode
        ld      b, #oplow
        setbit  lowbat, [b]
        jmp     putlow lbloff:
        jsr     stbeep
lblof0:
        ld      b, #oplow
        clrbit  lowbat, [b]
        jmp     putlow ; FLSHLB uses the counter AVCNST to flash the low bat LED .5sec on every
; second. This register is safe to use because we can't have a low
; battery condition while charging.

flshlb:
        drsz    avcnst                  ;test the counter
        ret
        ld      avcnst, #(seccnt/2)+1   ; for .5 seconds
        bitif   lowbat, oplow           ;is the LED already on?
        jp      lbloff                  ; then turn it off
        jp      lblon                   ; else turn it on stbeep:
```

```
            ld      x, #temp                ;pointer for data to be output

; next, set up DRQ5 in OPL
            ld      a, oplow                ;get the op register data
            x       a, portd                ; so we can retreive this later
            ld      a, portd                ; emulate a store instruction
            or      a, #drq5                ;set the drq5 bit in the register save data
            x       a, portd                ; D port data = 00000001 for DRQ5
            ld      b, #portcd
            clrbit  milaad, [b]             ; C0 = 0
            setbit  milstb, [b]             ; C1 = 1 (this starts the DREQ cycle)

; now look for DACK
            ckdack

; next, pull master high in OPL
            ld      b, #portd               ; point to the D port
            setbit  master, [b]             ; D port data = 00000011 for master*
            clrbit  milstb, portcd          ; close the OP Low register ; Set the HT21 index register
            ld      [b], #05                ;point to the sleep control register
            except  iow, 01ED ; write desired data to D port
            x       a, [x]                  ;recover the data to output
            x       a, [b]                  ; and store it in port D ; execute the io write exception cycle to port 01EFh (HT21 Control)
            except  iow, 01EF x       a, [x]                  ;and recover original OP low ; clear DRQ and master*
            x       a, [b]                  ; A contains the original OP Low value
            ld      b, #portcd              ; point back to port C
            setbit  milstb, [b]             ; turn off master mode
            clrbit  milstb, [b]

; now set IO_M~ to M in OPH
            ld      b, #ophigh              ;point to the op register data storage
```

```
        clrbit  rom, [b]              ;point to memory
        jmpl    puthi cpuhld:
        ld      b, #portlp            ;point to the L port
        clrbit  cpuint, wkpnd         ;clear the interrupt pending flag
        bitif   cpuint, [b]           ;wait for the interrupt to be acknowledged
        jsrl    delay                 ; by the host cpu
        ld      a, oplow              ;get the op register data
        x       a, portd              ; so we can retreive this later
        ld      a, portd              ; emulate a store instruction
        or      a, #drq5              ;set the drq5 bit in the register save data
        x       a, portd              ; D port data = 00000001 for DRQ5
        ld      b, #portcd
        clrbit  milsad, [b]           ; C0 = 0
        setbit  milstb, [b]           ; C1 = 1 (this starts the DREQ cycle)

ckdeck

; next, pull master high in OPL
        ld      b, #portd             ; point to the D port
        setbit  master, [b]           ; D port data = 00000011 for master*
        clrbit  milstb, portcd        ; close the OP Low register
        x       a, [b]                ; recover current OP Low settings
        x       a, oplow              ; and save setbit  hldreq, mode          ;Tell interested parties about hold
        ld      b, #wkpnd
        clrbit  kbdint, [b]           ;Clear keyboard but not timer to start
        setbit  kbdint, wken
        setbit  cpuint, wken
        ret clrold:
        ld      cnt, #8               ;start with save area cleared
        ld      b, #crgrdg
clrcrg:
        clr     a
        x       a, [b+]
        drsz    cnt
        jp      clrcrg
```

```
            ret drvof1:
            ld      hdcmd, #0E0             ;Enter standby command ; This routine will become master and write the data in hdcmd to the Hard disk ctl reg
;
iowlf7:

; first set IO_M" to IO in OPH
            ld      b, #ophigh              ;point to the op register data storage
            setbit  iom, [b]                ; D port data = 10000000 for IO
            jsrl    puthi ld      x, #hdcmd               ;pointer for data to be output ; next, set up DRQ5 in OPL
            ld      a, oplow                ;get the op register data
            x       a, portd                ; so we can retreive this later
            ld      a, portd                ; emulate a store instruction
            or      a, #drq5                ;set the drq5 bit in the register save data
            x       a, portd                ; D port data = 00000001 for DRQ5
            ld      b, #portcd
            clrbit  milsed, [b]             ; C0 = 0
            setbit  milstb, [b]             ; C1 = 1 (this starts the DREQ cycle)

; now look for DACK
            ckdack

; next, pull master high in OPL
            ld      b, #portd               ; point to the D port
            setbit  master, [b]             ; D port data = 00000011 for master*
            clrbit  milstb, portcd          ; close the OP Low register except  ior, 03F6               ;read alternate status port
            x       a, [b]                  ;save OP Low              **
            ld      a, #L(03F6)             ;to retreive io data
            jsrl    ior300
            ifbit   7, a                    ;test disk busy status
            jp      hdbusy                  ;try again later
            ifeq    pendng, #0              ;no delay
```

```
        jp      hdwrit
        drsz    pendng              ;else lets wait a while
        jp      hdexit
hdwrit:
        x       a, [b]              ;recover registers for now **

; write desired data to 0 port
        x       a, [x]              ;recover the data to output
        x       a, [b]              ; and store it in port 0

; execute the io write exception cycle to port 01F7h (HD Control)
        except  iow, 01F7 x       a, [x]              ;and recover original OP low

; clear DRQ and master*
        x       a, [b]              ; A contains the original OP Low value
hdexit:
        ld      b, #portcd          ; point back to port C
        setbit  milstb, [b]         ; turn off master mode
        clrbit  milstb, [b]

; now set IO_M to M in OPH
        ld      b, #ophigh          ;point to the op register data storage
        clrbit  iom, [b]            ;point to memory
        jsri    puthi
        clrbit  hdcs0, wkpnd        ;so we don't interrupt again
        ret hdbusy:
        ld      pendng, #12         ;set the flag for 60 msec delay
        jp      hdexit ; The XSUMP routine checksums the system parameter data area to validate
; the initial settings in case of a total system power failure that
; causes the COP setings to be invalid xsump:
        clr     a
        ld      x, #systim
        ld      b, #temp
```

```
        x       a, [b]          ;Clear the accumulator
        ld      cnt, #4
xslop:
        ld      a, [x+]         ;Get the parameter
        add     a, [b]          ; and add it to the accumulator
        x       a, [b]          ;save it back
        drsz    cnt
        jp      xslop
        ld      a, [b]          ;return with calculated checksum in A
        ret                     ; X points to stored checksum ; GET1P gets 1 parameter to the data location DEBUG for test purposes get4p:
        ld      cnt, #4
        jp      getp
get1p:
        ld      cnt, #1
getp:
        ld      x, #debug
        jmp     gvparm .=01E00
m1e00:
        laid                    ;Allow COP to store parameters
        ret                     ; at 1E02-1EFF .=01F00                 ;place this at the top of SRAM ; The GETCMD routine will return the value of a command
; placed at address 1F80h by the host CPU. The COP can
; then call GSPARM or GVPARM to retreive the parameters
; to an area in the data ram of the COP processor
;
; On Entry:
;
;       CNT contains the number of parameters to retreive
;
; for GVPARM
```

```
;       X contains the address to store the parameters in COP data space
;
;
; On Exit:
;
;       The PSAVE area contains the parameters getcmd:
        ld      a, #080             ;Address of command on this page
        laid                        ; get contents of 1F80h
        ret gsparm:
        ld      x, #psave           ;point to the COP parameter area
gvparm:
        ld      b, #temp            ;temporary storage
        ld      [b], #081           ;address of parameters in SRAM
ploop:
        ld      a, [b]              ;address of current parameter
        laid                        ; get parameter
        x       a, [x+]             ; and store it in data space
        x       a, [b]              ;get address
        inc     a                   ; and bump it
        x       a, [b]              ; then put it back for next time
        drsz    cnt                 ;decrement the counter
        jp      ploop               ; and continue till done
        ret .end
```

```
; EXCEPTION MACROS

IOR     =       04C00           ; I/O read exception cycle
        IOW     =       06000           ; I/O write exception cycle
        SRAMW   =       04000           ; SRAM write exception cycle
        SCDONE  =       06000           ; Set CDONE bit exception cycle ;       IOR forces the read data to be in the range C00h - FFF ;       the macro EXCEPT takes three parameters:  type (one of the above),
;       addr (four hex digits giving the exception address)

.macro  except, type, addr
        .byte   0AD
        .addrw  type | addr
        .endm ; The BIT macros (SETBIT, CLRBIT, BITIF) allow the user to specify the
; bit to be set/reset/tested using the same label name that is used as
; a mask value.

.macro  bit, bitnum            ;yields the mask value corresponding
        .set    mask,1
        .if     bitnum
        .do     bitnum                 ; to the bit number
        .set    mask,mask*2
        .enddo
        .if     H(mask)
        .set    mask,H(mask)
        .endif
        .endif
        .endm .macro  bitnum, mskval         ;gets the bit number coresponding
                                       ; a mask value
        .set    dummy, mskval
        .set    bitnum,0
        .do     7
        .set    dummy,dummy/2
        .if     dummy
```

```
        .set    bitnum,bitnum+1
    .else
        .exit
    .endif
.enddo
.endm .macro  setbit, dummy, addr     ;getnerate the sbit instruction
                                ; from the mask label
.if     a<2
.error  No Paramerter for bit operation
.else
bitnum  dummy
sbit    bitnum, addr
.endif
.endm .macro  clrbit, dummy, addr     ;getnerate the rbit instruction
                                ; from the mask label
.if     a<2
.error  No Paramerter for bit operation
.else
bitnum  dummy
rbit    bitnum, addr
.endif
.endm .macro  bitif, dummy, addr      ;getnerate the ifbit instruction
                                ; from the mask label
.if     a<2
.error  No Paramerter for bit operation
.else
bitnum  dummy
ifbit   bitnum, addr
.endif
.endm
```

```
; The macro CKDACK generates the code to check for dma acknowledge
; using a local label so that the label names do not have to be changed
; everyplace this is used .macro  ckdack
        ld      b, #ackprt              ;point to the port that DACK is on
        .mloc   cdack
cdack:
        bitif   dack, [b]
        jp      cdack
        .endm
```

What is claimed is:

1. A computer system comprising:

multiple electronic components connected together, including at least one microprocessor and one display;

a receptacle, within said computer system, electrically connected to said multiple electronic components, for receiving a removable battery pack, said battery pack containing at least two separate battery banks;

a switching unit, electrically connected to said multiple electronic components, and to said battery banks, to switch between said at least two separate battery banks such that a selected one of said at least two separate battery banks is coupled to provide power to said computer system at a given time;

control logic, connected to said switching unit and configured to cause said switching unit to switch repeatedly between said at least two separate battery banks at a predetermined set frequency; and at least two charger circuits respectively coupled to said at least two separate battery banks;

wherein coupling said computer system to an external power source enables the simultaneous powering of said computer system and charging of both of said at least two separate battery banks via said at least two charger circuits.

2. The computer system as recited in claim 1 wherein said switching unit is a relay.

3. The computer system as recited in claim 1 wherein said predetermined set frequency is selected such that said control logic switches between said at least two separate battery banks approximately every four minutes.

* * * * *